(12) United States Patent
Josefsson et al.

(10) Patent No.: US 12,157,295 B2
(45) Date of Patent: Dec. 3, 2024

(54) BUILDING PANEL AND A METHOD TO PRODUCE SUCH A BUILDING PANEL

(71) Applicant: Välinge Innovation AB, Viken (SE)

(72) Inventors: Per Josefsson, Ramlösa (SE); Martin Bjeremyr, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 17/686,994

(22) Filed: Mar. 4, 2022

(65) Prior Publication Data
US 2022/0388278 A1 Dec. 8, 2022

(30) Foreign Application Priority Data
Mar. 4, 2021 (SE) .................................. 2150248-9

(51) Int. Cl.
| | |
|---|---|
| B32B 9/04 | (2006.01) |
| B32B 9/00 | (2006.01) |
| B32B 27/22 | (2006.01) |
| B32B 27/30 | (2006.01) |
| B32B 37/06 | (2006.01) |
| B32B 37/10 | (2006.01) |
| B32B 38/06 | (2006.01) |
| E04C 2/20 | (2006.01) |

(52) U.S. Cl.
CPC .............. *B32B 9/045* (2013.01); *B32B 9/002* (2013.01); *B32B 27/22* (2013.01); *B32B 27/306* (2013.01); *B32B 37/06* (2013.01); *B32B 37/10* (2013.01); *B32B 38/06* (2013.01); *E04C 2/20* (2013.01); *B32B 2270/00* (2013.01); *B32B 2307/554* (2013.01); *B32B 2307/732* (2013.01); *B32B 2309/02* (2013.01); *B32B 2309/12* (2013.01); *B32B 2318/04* (2013.01); *B32B 2327/06* (2013.01); *B32B 2419/00* (2013.01)

(58) Field of Classification Search
None
See application file for complete search history.

(56) References Cited

U.S. PATENT DOCUMENTS

| | | | |
|---|---|---|---|
| 3,365,353 A | 1/1968 | Witman | |
| 3,953,639 A * | 4/1976 | Lewicki, Jr. .......... | B29C 59/046 |
| | | | 428/159 |

(Continued)

FOREIGN PATENT DOCUMENTS

| | | |
|---|---|---|
| SE | 402418 B | 7/1978 |
| WO | 01/00406 A1 | 1/2001 |

(Continued)

OTHER PUBLICATIONS

U.S. Appl. No. 17/686,838, filed Mar. 4, 2022, Pontus Gamstedt.

(Continued)

*Primary Examiner* — Michael N Orlando
*Assistant Examiner* — Abhishek A Patwardhan
(74) *Attorney, Agent, or Firm* — Boone IP Law

(57) ABSTRACT

A building panel, such as a floor panel, having a core comprising at least one or more of a thermoplastic material, a thermoset material, a mineral based material or a combination thereof. The building panel further including a first arrangement, arranged on said core, having a surface layer and a sublayer, where the sublayer is arranged between the core and the surface layer.

26 Claims, 12 Drawing Sheets

(56) References Cited

U.S. PATENT DOCUMENTS

| | | | | |
|---|---|---|---|---|
| 2004/0026027 | A1* | 2/2004 | Walters | B44C 5/0453 |
| | | | | 428/98 |
| 2010/0319282 | A1* | 12/2010 | Ruland | E04F 15/10 |
| | | | | 52/309.3 |
| 2015/0121793 | A1* | 5/2015 | Segaert | B29C 70/081 |
| | | | | 52/506.01 |
| 2016/0174725 | A1* | 6/2016 | Takaoka | A47C 27/006 |
| | | | | 5/652.1 |
| 2018/0290418 | A1* | 10/2018 | Nelson | B32B 27/08 |
| 2018/0363304 | A1 | 12/2018 | Hannig | |

FOREIGN PATENT DOCUMENTS

| | | |
|---|---|---|
| WO | 2011/141849 A2 | 11/2011 |
| WO | 2018201309 A1 | 5/2017 |
| WO | 2018130924 A1 | 1/2018 |
| WO | 2020/145871 A1 | 7/2020 |

OTHER PUBLICATIONS

U.S. Appl. No. 18/063,829, filed Dec. 9, 2022, Pontus Gamstedt.
U.S. Appl. No. 18/243,224, filed Sep. 7, 2023, Lucas Larsson.
International Preliminary Report on Patentability received for PCT Patent Application No. PCT/SE2022/050212, mailed on Sep. 14, 2023, 8 pages.
International Search Report and Written Opinion received for PCT Patent Application No. PCT/SE2022/050212, mailed on Apr. 29, 2022, 13 pages.

* cited by examiner

BUILDING PANEL AND A METHOD TO PRODUCE SUCH A BUILDING PANEL

CROSS REFERENCE TO RELATED APPLICATIONS

The present application claims the benefit of Swedish Application No. 2150248-9, filed on Mar. 4, 2021. The entire contents of Swedish Application No. 2150248-9 are hereby incorporated herein by reference in their entirety.

FIELD OF THE INVENTIVE CONCEPT

The present inventive concept relates to a building panel, e.g. a flooring panel and especially to the laminated structure of such a building panel. Further, the present inventive concept relates to a method to produce such building panel.

TECHNICAL BACKGROUND

Building panels such as Luxury Vinyl Tiles (LVT) or Stone Plastic Composite panels (SPC panels) are examples of today very popular building panels, especially flooring panels, which have the advantages of being durable and easy to maintain.

A SPC panel is a more rigid panel than a LVT panel, having an E-modulus of 2 000-10 000 MPa often containing inorganic fillers, such as chalk, at an amount of 50-90 wt %. A LVT panel usually has an E-modulus of less than 2 000 MPa since it often contains plasticizer of an amount of 1-20 wt %.

However, such panels often have limitations and disadvantages in their manufacturing process, as the core of these panels are often made of highly filled thermoplastic material, thermosetting materials, hard wood based boards or inorganic material such as mineral based materials. These types of cores are usually very hard and therefore rather difficult to make a desirable embossing on. For example, if an SPC board or another thermoplastic board were to be laminated and embossed with a surface material it would be necessary to use a lot of surface material to achieve a proper embossing, or if a highly filled thermoplastic board or a mineral-based board, like an MgO-board, is to be laminated with a thin thermoplastic décor layer it would likewise be very difficult to achieve a proper embossing. In manufacturing processes used today this disadvantage is overcome by using high temperatures, high pressure, long pressing timers and/or thick layers of material, e.g. powder or surface layers. This leads to inefficient manufacturing processes or expensive and material consuming manufacturing processes.

SUMMARY

An object of the present inventive concept is to provide improvements over known art. This object is achieved by a technique defined in the appended independent claims; certain embodiments being set forth in the related dependent claims.

Another object of the present inventive concept is to provide a building panel with improved embossing properties.

Yet another object of the present inventive concept is to make the manufacturing process more efficient without making it or the building panel more expensive.

In a first aspect of the present inventive concept, there is provided a building panel, such as a floor panel, including a core comprising at least one or more of a thermoplastic material, a thermoset material, a mineral based material or a combination thereof. Further the building panel includes a first layer arrangement, arranged on the core, having a surface layer and a formable sublayer, wherein the formable sublayer is arranged between the core and the surface layer. An advantage with the present inventive concept is that the core is protected from e.g. embossing of different depths of the building panel. The formable sublayer allows deeper embossing of the building panel without affecting the core or having to take the material of the core into account when performing a desirable embossing of the panel. Thus, the possibilities of choosing among different types of desirable materials for the core is increased by having the formable sublayer.

In an embodiment the formable sublayer comprises at least one or more of a thermoplastic material, a thermoset material or a combination thereof. These types of materials are suitable for forming a formable layer.

In another embodiment the formable sublayer includes a filler, wherein the filler comprises at least one or more of an organic filler, an inorganic filler, or a combination thereof. Fillers have the advantages of e.g. improving layer properties and being cost efficient.

In yet another embodiment the filler is calcium carbonate ($CaCO_3$). This type of filler is especially cost efficient and easy to get a hold of. The formable layer may include 1-80 wt. % calcium carbonate ($CaCO_3$).

In an embodiment, the filler may instead comprise organic fillers such as wood flour and/or rice husks. These types of organic fillers are often cost efficient and easy to get a hold of. Further, the formable sublayer may comprise 1-70 wt. % organic filler, preferably 30-57 wt. % organic filler.

Further, in an embodiment the formable sublayer has a thickness of 0.1-2 mm, preferably a thickness of 0.2-1 mm, and even more preferably thickness of 0.3-0.7 mm.

Further, the formable sublayer may comprise plastisol. Plastisol gives the formable sublayer soft and durable properties.

Yet further, the formable sublayer may comprise a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. A plasticizer provides the sublayer with desirable formable properties.

In an embodiment the surface layer comprises a décor layer, such as a coloured powder layer, a paper sheet, a polymer-based sheet, a wood-based veneer, a cork-based veneer or a fabric, woven or non-woven. Decors and structures of such a surface layer may benefit from the formable sublayer as the design of the décor may be enhanced.

In another embodiment the building panel further comprising a second layer arrangement arranged on the core, on the opposite side of the first layer arrangement. An advantage of having a second layer arrangement on the opposite side of the core is to balance the building panel and to avoid e.g. shape deformations of the panel, such as cupping.

In a second aspect of the inventive concept there is provided a method to manufacture a building panel, such as a floor panel, comprising: joining a first material and a second material to form a first layer and a second layer of a semi-finished panel, wherein the first material comprises at least one or more of a thermoplastic material, a thermoset material, a mineral based material and/or a combination thereof, applying a third layer on the second layer, and applying heat and pressure to form the building panel, wherein the second layer forms a formable sublayer between the first layer and the third layer.

An advantage with the present inventive concept is that the first layer, which may be a core, is protected from e.g. embossing of different depths of the building panel. The formable sublayer allows deeper embossing of the building panel without affecting the first layer or having to take the material of the first layer into account when performing a desirable embossing of the panel. Thus, the possibilities of choosing among different types of desirable materials for the first layer is increased by having the formable sublayer.

In an embodiment the method further comprising embossing the second layer and the third layer. This is desirable if e.g. a décor of the building panel benefits from such an embossing and the formable sublayer allows both shallow and/or deep embossing without affecting the first layer.

In another embodiment the second layer comprises at least one or more of a thermoplastic material, a thermoset material, a mineral based material or a combination thereof. These types of materials are suitable for forming a formable layer.

In yet another embodiment the second layer comprises a filler, wherein the filler comprises at least one or more of an organic filler, an inorganic filler or a combination thereof. Fillers have the advantages of e.g. improving layer properties and being cost efficient.

The filler may be calcium carbonate ($CaCO_3$) and the second layer may comprise 1-30 wt % calcium carbonate ($CaCO_3$). This type of filler is especially cost efficient and easy to get a hold of.

The filler may further comprise organic fillers such as wood flour and/or rice husks. These types of organic fillers are often cost efficient and easy to get a hold of. Further, the second layer may comprise 1-70 wt. % organic filler, preferably 30-70 wt. % organic filler.

In an embodiment the second layer has a thickness of 0.1-2 mm, preferably a thickness of 0.2-1 mm, and even more preferably thickness of 0.3-0.7 mm.

Further, the second layer may comprise plastisol. Plastisol gives the second layer soft and durable properties.

Yet further, the second layer may comprise a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. A plasticizer provides the layer with desirable formable properties.

In an embodiment the third layer comprises a décor layer, such as a coloured powder layer, a paper sheet, a polymer-based sheet, a wood-based veneer, a cork-based veneer or a fabric, woven or non-woven. Decors and structures of such a third layer may benefit from the formable second layer as the design of the décor may be enhanced.

In an embodiment the method further comprising applying a fourth layer on the first layer opposite the second layer, wherein the fourth layer forms a balancing layer of the building panel. An advantage of having a fourth layer on the opposite side of the first layer is to balance the building panel and to avoid e.g. shape deformations of the panel, such as cupping.

In a third aspect of the present inventive concept there is provided a method to manufacture a building panel, such as a floor panel, comprising:

joining a first material and a second material to form a first layer and a second layer of a semi-finished panel, wherein said first material comprises at least one or more of a thermoplastic material, a thermoset material, a mineral based material and/or a combination thereof, applying a third layer on the second layer, and applying heat and pressure to form said building panel, wherein the first layer forms a core of the building panel, and the third layer forms a surface layer of the building panel, and wherein the second layer forms a sublayer between the first layer and the third layer of the building panel, wherein the second layer is configured to be at least partly plastically deformed when heat and pressure is applied.

An advantage with the present inventive concept is that it is easy to form a desirable embossing in the building panel when the plastically deformable sublayer is present. Further, the first layer may be protected from deeper embossings by the sublayer which also means that the choice of material for the first layer is broaden since if does not have to be configured for a possible embossing. The plastically deformable sublayer also has a beneficial effect on the third layer, being the surface layer of the finished building panel, since the appearance of the décor of the third layer may be enhanced and easier to manufacture having the plastically deformable sublayer below.

In an embodiment the first material includes at least 10 wt %, at least 15 wt % or at least 20 wt % of a thermoplastic material.

In another embodiment the first material includes 10-40 wt %, 15-35 wt %, or 20-30 wt % of a thermoplastic material.

In yet another embodiment the first material includes 10-70 wt %, 20-60 wt % or 25-50 wt % of a thermoset material.

In yet another embodiment the first material include at least 50 wt %, at least 60 wt % or at least 70 wt % of a mineral based material.

In an embodiment the step of applying heat and pressure to form said building panel further comprises:

embossing the second layer and the third layer, where the second layer and the third layer are at least partly plastically deformed by the embossing.

The second layer may comprise at least one or more of a thermoplastic material, a thermoset material, or a combination thereof.

Further, the second layer may comprise a filler, where said filler may comprise at least one or more of an organic filler, an inorganic filler or a combination thereof.

The second layer may have a thickness of 0.1-2 mm, a thickness of 0.2-1 mm, or a thickness of 0.3-0.7 mm.

In an embodiment the second layer comprises plastisol.

Further, the second layer may comprise a plasticizer, where the second layer may comprise 1-30 wt. % plasticizer, or 2-15 wt. % plasticizer.

In another embodiment the second layer comprises at least two different types of polymers.

The second layer may comprise a material blend comprising a PVC/PVAc co-polymer, where the PVAc content in the material blend of the second layer may be 1-20 wt. %.

In an embodiment the third layer comprises a décor layer, such as a coloured powder layer, a paper sheet, a polymer-based sheet, a wood-based veneer, a cork-based veneer or a fabric, woven or non-woven.

In another embodiment the third layer comprises a wear layer, such as a wear resistant foil or a wear layer having wear resistant particles.

The method may further comprise:

applying a fourth layer on the first layer opposite the second layer, wherein the fourth layer forms a balancing layer of said building panel.

In an embodiment the fourth layer is configured to be plastically deformed when heat and pressure is applied.

In a fourth aspect of the present inventive concept there is provided a building panel obtained by the method according to the fourth aspect of the inventive concept.

In a fifth aspect of the present inventive concept there is provided a building panel, such as a floor panel, comprising:

a core comprising at least one or more of a thermoplastic material, a thermoset material, a mineral based material or a combination thereof, a layer arrangement, arranged on said core, comprising a surface layer and a sublayer, wherein said sublayer is arranged between said core and said surface layer, and wherein the sublayer is configured to be plastically deformable under heat and pressure.

In an embodiment the core includes at least 10 wt %, at least 15 wt % or at least 20 wt % of a thermoplastic material.

In another embodiment the core includes 10-40 wt %, 15-35 wt %, or 20-30 wt % of a thermoplastic material.

In yet another embodiment the core includes 10-70 wt %, 20-60 wt % or 25-50 wt % of a thermoset material.

In yet another embodiment the core include at least 50 wt %, at least 60 wt % or at least 70 wt % of a mineral based material.

The sublayer may comprise at least one or more of a thermoplastic material, a thermoset material, or a combination thereof.

Further, the sublayer may comprise a filler, where said filler may comprise at least one or more of an organic filler, an inorganic filler or a combination thereof.

The sublayer may have a thickness of 0.1-2 mm, a thickness of 0.2-1 mm, or a thickness of 0.3-0.7 mm.

In an embodiment the sublayer comprises plastisol.

Further, the sublayer may comprise a plasticizer, where the sublayer may comprise 1-30 wt. % plasticizer, or 2-15 wt. % plasticizer.

In another embodiment the sublayer comprises at least two different types of polymers.

The sublayer may comprise a material blend comprising a PVC/PVAc co-polymer, where the PVAc content in the material blend of the sublayer may be 1-20 wt. %.

In an embodiment the surface layer comprises a décor layer, such as a coloured powder layer, a paper sheet, a polymer-based sheet, a wood-based veneer, a cork-based veneer or a fabric, woven or non-woven.

In another embodiment the surface layer comprises a wear layer, such as a wear resistant foil or a wear layer having wear resistant particles.

In yet another embodiment the building panel further comprises a second layer arrangement arranged on the core, on the opposite side of the first layer arrangement.

The second layer arrangement may be configured to be plastically deformable under heat and pressure.

BRIEF DESCRIPTION OF THE DRAWING

Embodiments of the inventive concept will be described in the following; reference being made to the appended drawings which illustrate non-limiting embodiments of how the inventive concept can be reduced into practice.

DETAILED DESCRIPTION OF EMBODIMENTS

Although the inventive concept will be described below with reference to specific embodiments, it is not intended to be limited to the specific form set forth herein. Rather, the inventive concept is limited only by the accompanying claims. Other embodiments than the specific above are equally possible within the scope of the appended claims.

Figure 1:
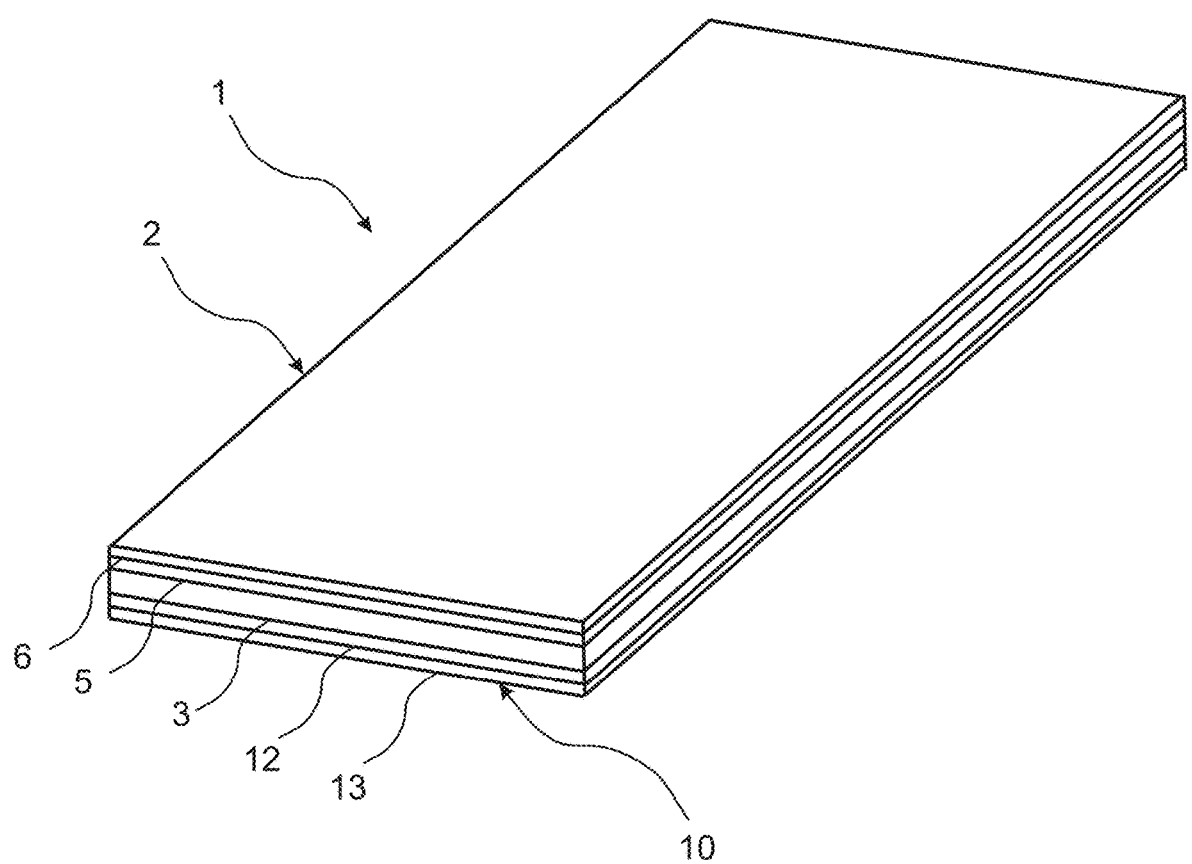
FIG. 1 schematically illustrate a building panel such as a flooring panel according to an embodiment of the present inventive concept.

In FIG. 1 a building panel 1 is illustrated. The building panel 1 may be a flooring panel, a ceiling panel, a wall panel, a door panel, a worktop, a furniture component, a skirting board, etc. The building panel 1 includes a first layer 3, from now on called a core 3, and a layer arrangement 2, also called the upper layer arrangement 2.

The core 3 comprises at least one or more of a thermoplastic material, a thermoset material, a mineral based material or a combination thereof.

Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof.

A core based on a thermoplastic material may include at least 10 wt %, at least 15 wt % or at least 20 wt % of the thermoplastic material. Such core may further include an inorganic filler of at least 50 wt %, at least 60 wt % or at least 65 wt %. Such core may further include additives.

A SPC core, which may be included in the inventive concept of the application, may include 10-40 wt %, 15-35 wt %, or 20-30 wt % of a thermoplastic material, such as PVC. The SPC core may further include 50-90 wt %, 60-80 wt % or 65-75 wt % of an inorganic filler, such as chalk. The SPC core may further include 0-20 wt %, 1-15 wt % or 2-10 wt % of additives, such as impact modifier, stabilizer, lubricant and/or pigment.

A LVT type of panel would have a similar content of material as the SPC core above, i.e. 10-40 wt %, 15-35 wt %, or 20-30 wt % of a thermoplastic material, 50-90 wt %, 60-80 wt % or 65-75 wt % of an inorganic filler and 0-20 wt %, 1-15 wt % or 2-10 wt % of additives, but with the addition of 1-20 wt %, 2-15 wt % or 3-10 wt % of a plasticizer.

Examples of suitable thermoset material are epoxy, polyurethane, cross-linked polyethylene (PEX), amino plastics, phenolic plastics, acrylates and/or a combination thereof.

A core based on a thermoset material may include 10-70 wt %, 20-60 wt % or 25-50 wt % of a thermoset resin, such as aminoplastics, polyurethanes, phenoplastics, epoxy or acrylics. Such core may further include 0-70 wt %, 10-70 wt % or 20-70 wt % of a filler, such as an inorganic filler. Such core may further include one or more additives, such as impact modifier, stabilizer, lubricant and/or pigment.

An example of a suitable mineral based material is magnesium oxide (MgO), magnesium chloride (MgCl2), magnesium sulfate (MgSO4), or sand. A core based on these types of mineral materials may further include 1-20 wt % or 5-15 wt % filler, such as an organic filler e.g. wood fibres.

Another type of suitable mineral based material is e.g. Portland cement. A core based on this type of mineral material may be called a fibre cement board, may further include sand and/or 1-20 wt % or 5-15 wt % filler, such as an organic filler e.g. wood fibres.

A core based on a mineral based material may include at least 50 wt %, at least 60 wt %, at least 70 wt %, or at least 80 wt % of the mineral based material. The core 3 may further include a filler, as described above in the examples of each core type. The filler may be an organic filler, an inorganic filler or a combination thereof. Examples of inorganic fillers are calcium carbonate (CaCO3), barium sulphate (BaSO4), talc, and/or a combination thereof. The core 3 may comprise, e.g., more than 50 wt. % of such an inorganic filler, or even more than 70 wt. % of such a filler. An example of an organic filler is wood fibres, as described above.

The layer arrangement 2 is arranged on one side of the core 3, being the upper or front side facing the user when the building panel 1 is installed, as illustrated in the figures. The layer arrangement 2 includes a second layer 5, from now on called the sublayer 5 and a third layer 6, from now on called the surface layer 6. The sublayer 5 is arranged between the core 3 and the surface layer 6.

The sublayer 5 is configured to be plastically deformable when heat and pressure are applied thereto, e.g., during a manufacturing process to form the building panel 1. The sublayer 5 is at least partly plastically deformed when heat and pressure is applied during the manufacturing process, preferably be means of an embossing process.

A plastically deformable layer is one where the shape of the layer may be changed under the application of heat and pressure, and the changed shape may be maintained during and after the application of heat and pressure. For example, depressions and/or elevations, may be formed in the material of a plastically deformable layer by application of heat and pressure, and the depressions and/or elevations may be maintained during and after the application of heat and pressure. A plastically deformable layer may be considered sufficiently plastically deformable when a depression of 0.04 mm is formed when an embossing plate with a rill of 1.2 mm depth and a base width of 2 mm is pressed against the layer at a pressure of 20 bar and a temperature of 80° C. for 35 seconds. In further embodiments, a plastically deformable layer may be considered sufficiently plastically deformable when a depression of 0.06 mm, such as 0.08 mm, such as 0.1 mm, such as 0.12 mm is formed when an embossing plate with a rill of 1.2 mm depth and a base width of 2 mm is pressed against the layer at a pressure of 20 bar and a temperature of 80° C. for 35 seconds.

In a method of manufacturing, a controlled embossing may form depressions and/or elevations with a pressing occurring within a temperature range of 10-300° C., such as 50-220° C., such as 75 and 180° C. and with pressure range of 1-100 bar, such as 1-50 bar, such as 1-30 bar, for a time period of 0.1-500 seconds, such as 0.5-300 seconds, such as 1-60 seconds.

In other embodiments, a plastically deformable layer may be considered sufficiently plastically deformable when the plastically deformable layer is more plastically deformable than the core layer. That is, a deeper depression is formed in the plastically deformable layer, as compared to a depression formed in the core, when each are pressed with an embossing plate with a rill of 1.2 mm depth and a base width of 2 mm at a pressure of 20 bar and a temperature of 80° C. for 35 seconds. For example, the depression in the plastically deformable layer may be at least 10% deeper, such as at least 25% deeper, such as at least 50% deeper than a depression formed in the core when each are pressed with an embossing plate with a rill of 1.2 mm depth and a base width of 2 mm at a pressure of 20 bar and a temperature of 80° C. for 35 seconds.

A purpose of the sublayer 5 being plastically deformable is to allow easier and/or deeper embossing of the building panel 1 during the manufacturing process, without affecting or at least having less effect on the core 3. Thus, an advantage with the plastically deformable sublayer 5 is that the core 3 is protected from the pressure of the embossing during the manufacturing process. Another advantage with the sublayer 5 being plastically deformable is that it may increase the appearance of a surface layer 6, and thus the design of the building panel 1. The surface layer 6 often having a decorative pattern may be intensified by a deeper embossing, e.g., a wood-like pattern with veins and cracks etc.

The plastically deformable sublayer 5 comprises at least one or more of a thermoplastic material, a thermoset material, or a combination thereof. Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates, and/or a combination thereof.

Further, the plastically deformable sublayer 5 may include a filler in order to lower the cost of the layer, to lower the weight of the layer, to be reinforcing, to improve the processability, to decrease the risk of movement in the material of the layer when heat and pressure is applied, and/or to provide better surface properties of the plastically deformable sublayer 5. The filler may be at least one or more of an organic filler, an inorganic filler, or a combination thereof.

An organic filler may be wood flour and/or rice husks. It may also be a filler made of coconut fibres, straw, flax, bagasse, or the like. These types of organic fillers are often accessible and easy to get hold of to a favorable price. Using one or more of these organic fillers, a preferred amount of such a filler is 1-70 wt. %, more preferably 30-70 wt. %. By having as much organic filler as possible the weight of the plastically deformable layer 5 and in turn the weight of the building panel may be decreased compared to the same layer without the organic filler, such as a plastically deformable sublayer made of pure thermoplastic material or pure thermoset material, or the same layer comprising a filler such as chalk. By having 30 wt. % or more of the organic filler in the sublayer 5 advantages like lower weight, lower price and less carbon footprint may be achieved.

An inorganic filler may be calcium carbonate ($CaCO_3$) which has the advantages of being cost efficient, accessible and easy to handle. A preferred amount of calcium carbonate ($CaCO_3$) as a filler in the sublayer 5 is 1-80 wt %, such as 5-70 wt %, such as 10-60 wt %, such as 20-50 wt %.

Further, the sublayer 5 may include plastisol which gives the sublayer 5 soft and durable properties. Plastisol is a suspension of polyvinyl chloride (PVC) or other polymer particles in a liquid plasticizer. The sublayer may include 30-70 wt % or 40-60 wt % of such a type of plasticizer.

Figure 9:
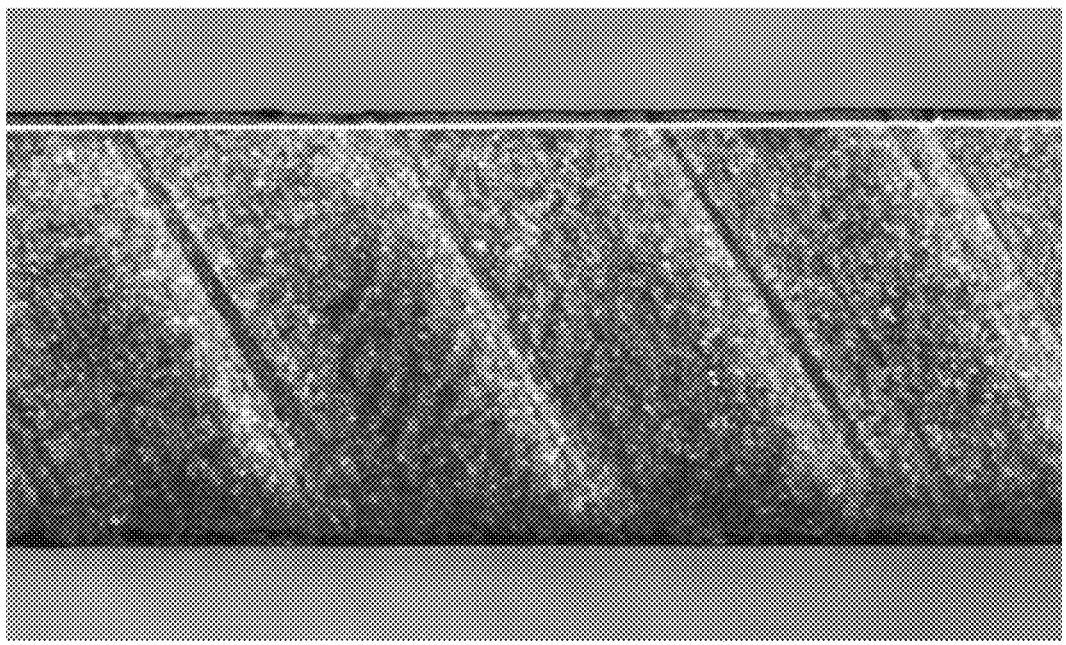
Figure 10:
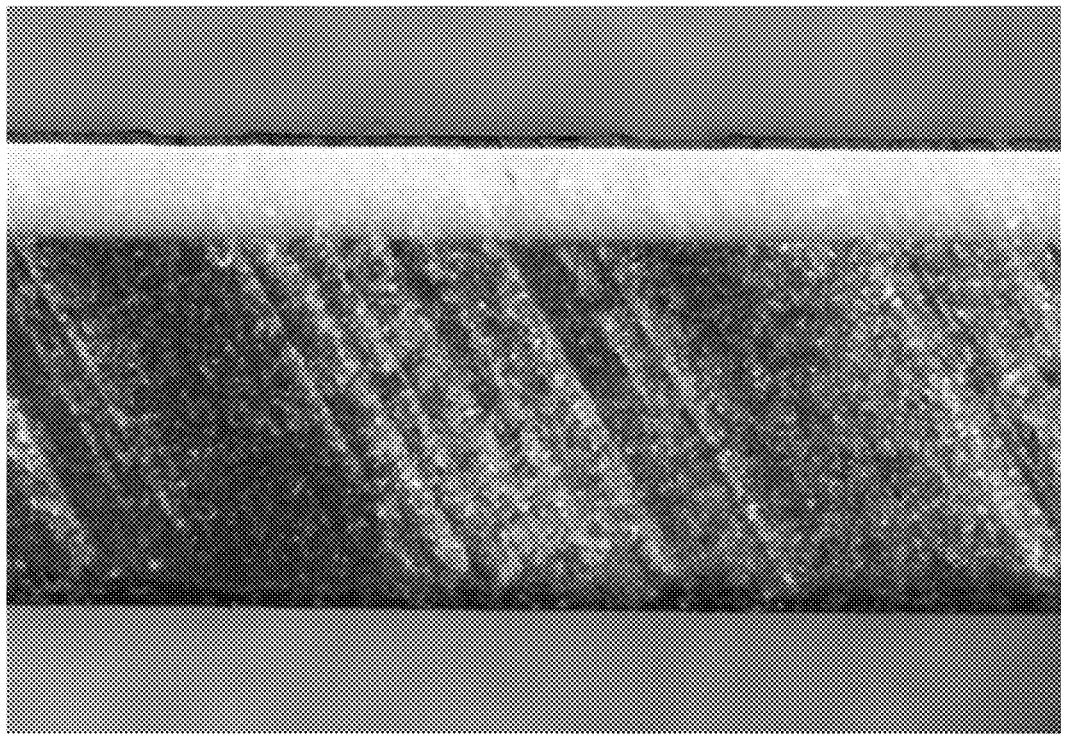
FIGS. 10-17 are photos of building panels according to embodiments of the inventive concept.
Figure 11:
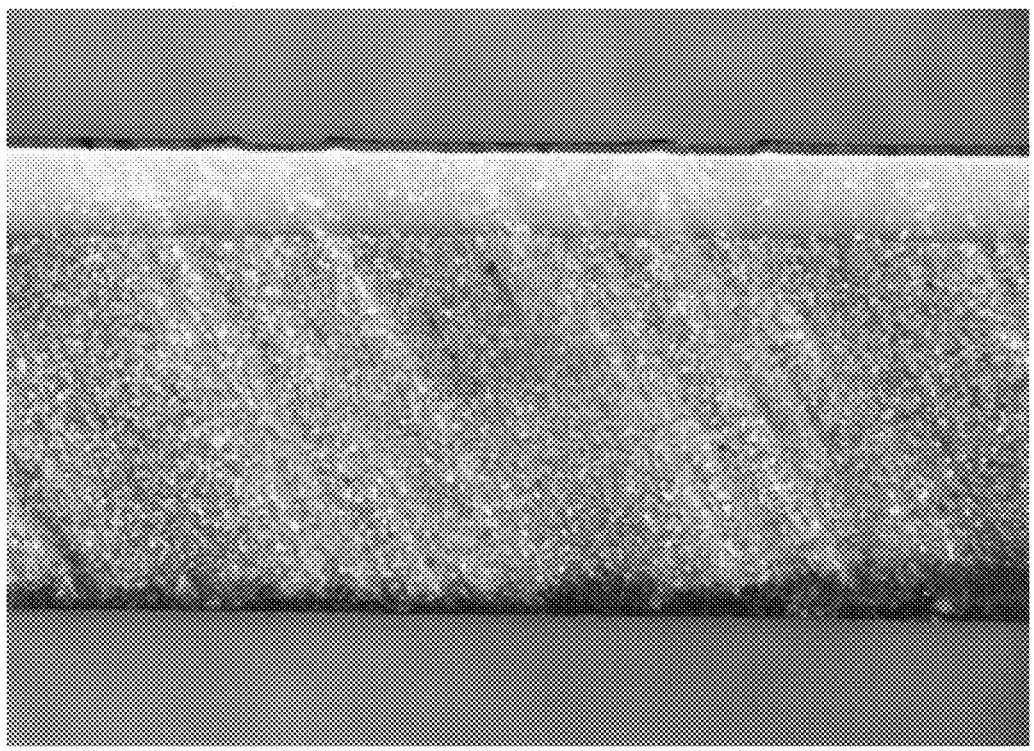
Figure 12:
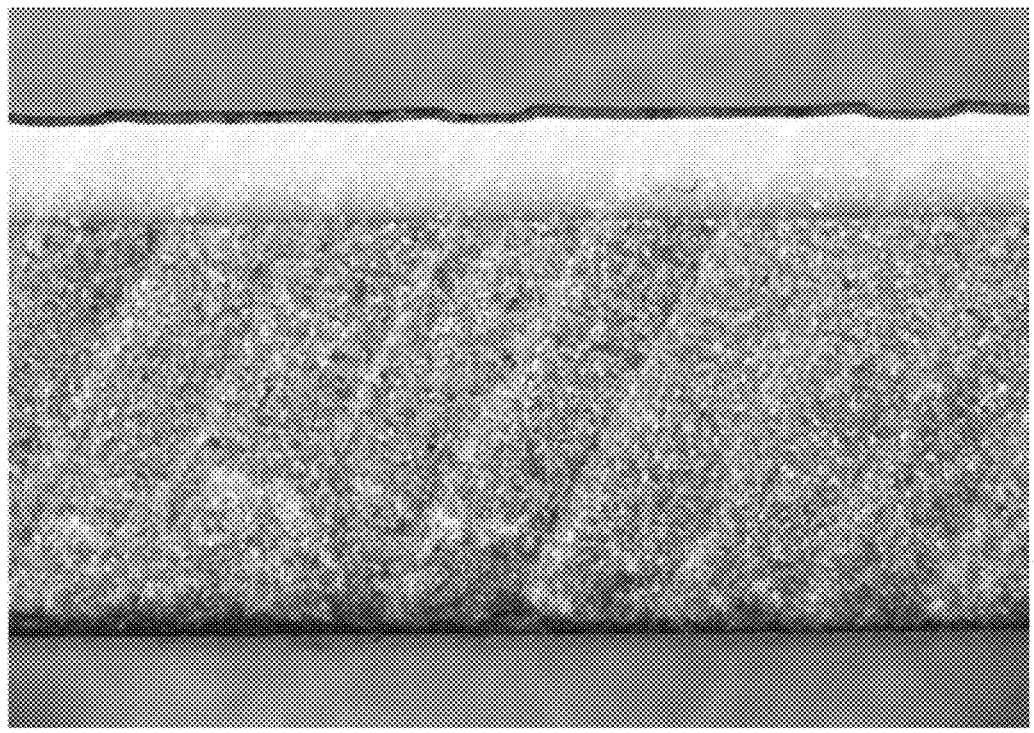
Figure 13:
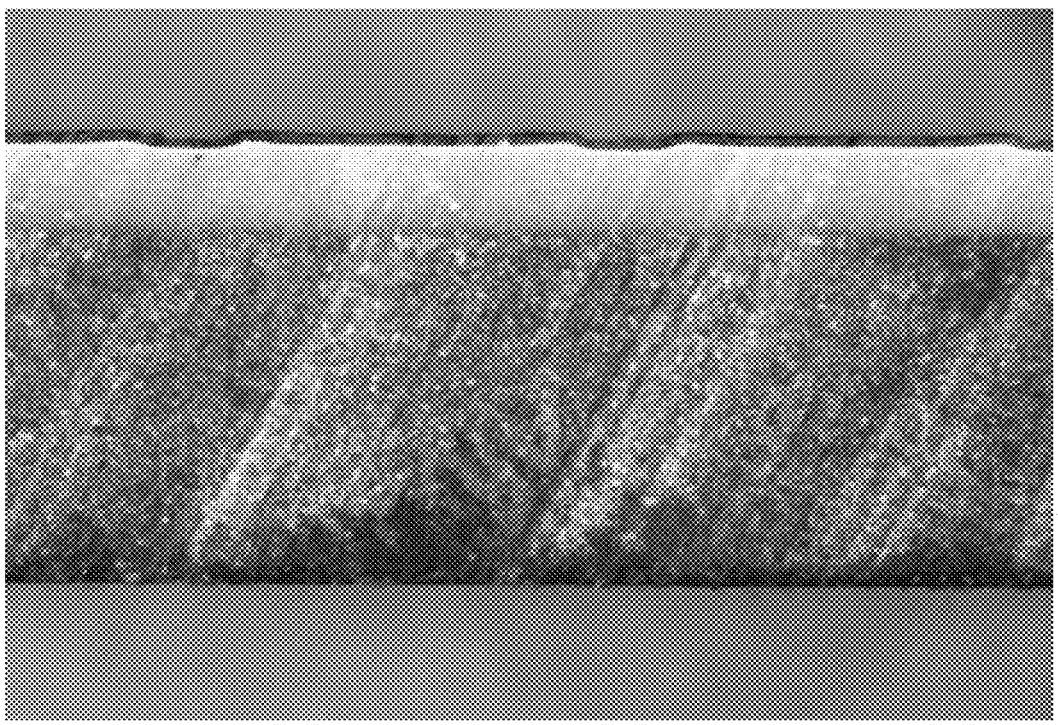
Figure 14:
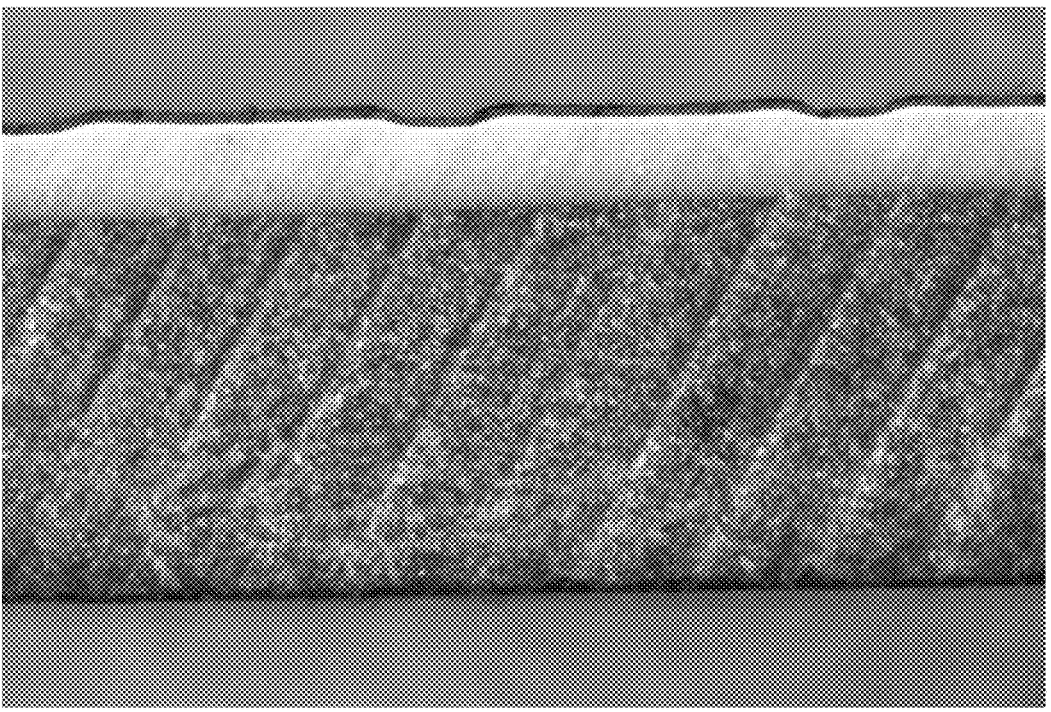
Figure 15:
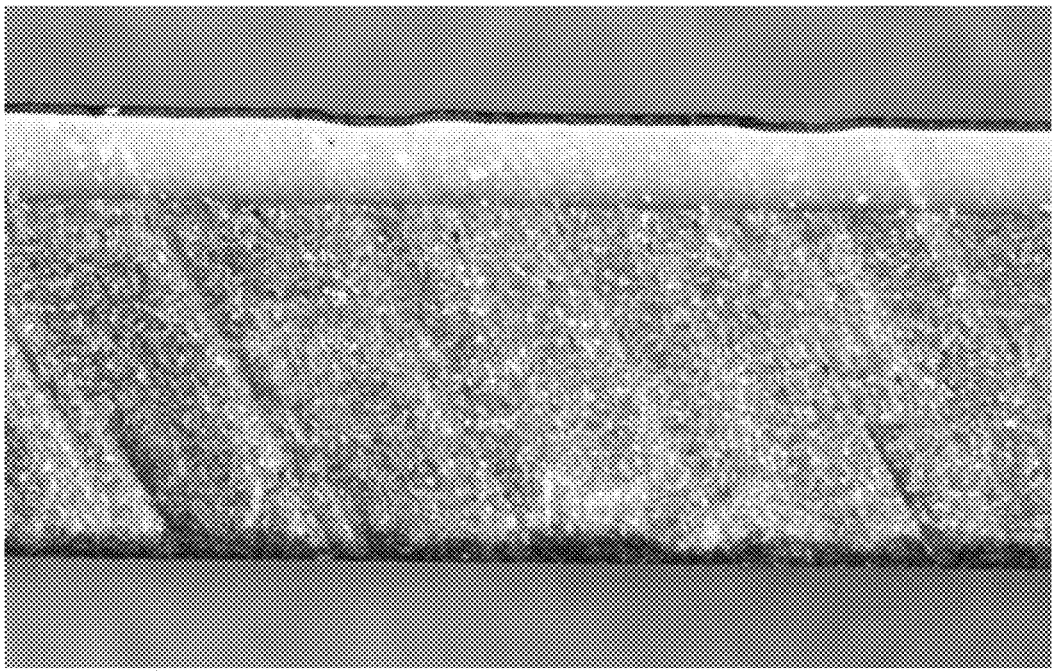
Figure 16:
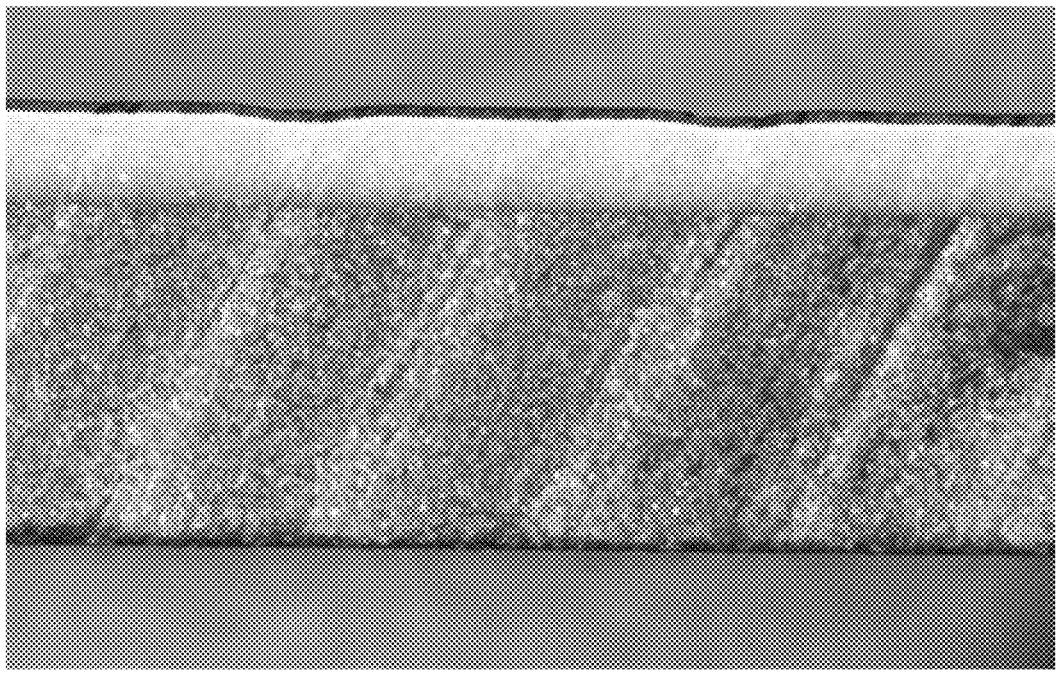
Figure 17:
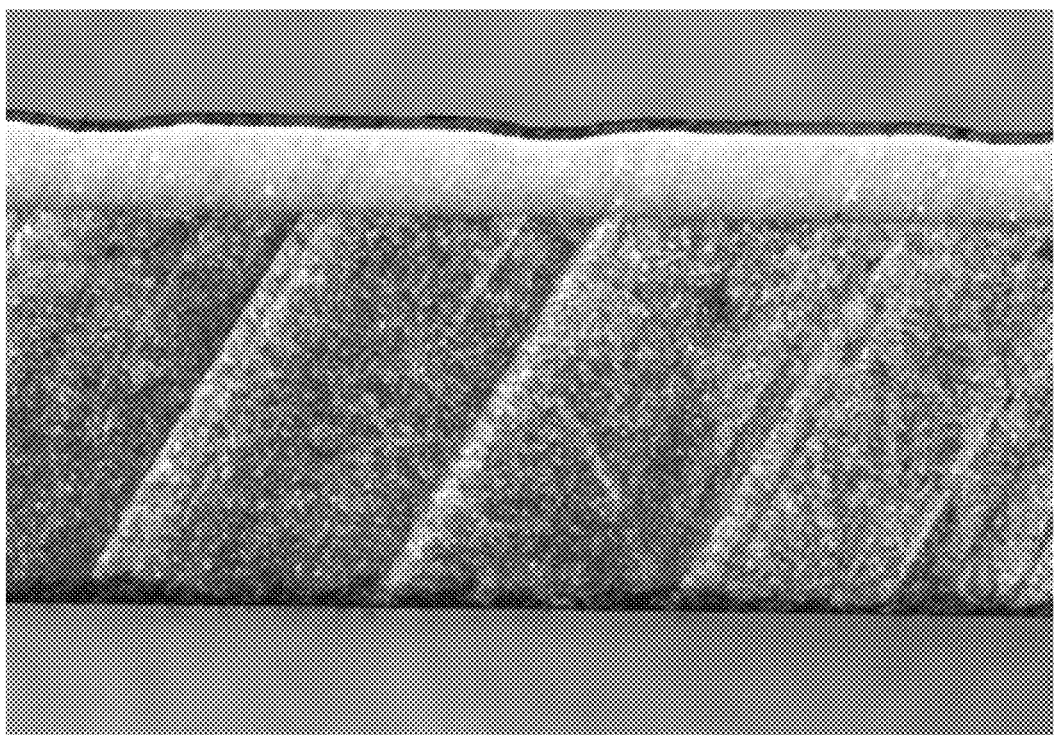

It is desirable when forming the building panel to both have a sublayer between the surface layer and the core in order to produce a deeper embossing than what may be achieved in a commonly used building panel, see FIG. 9 for an example of conventional embossing, and also have a sublayer provided with better thermoforming abilities in order to be able to form the embossing with preferably lower pressure and/or lower temperature and/or during shorter time in the pressing device than what is used today.

One way of providing the sublayer 5 with the preferred thermoforming abilities, to provide the sublayer 5 with plastically deformable properties may be to include a plasticizer to the sublayer 5, providing the sublayer 5 with the plastically deformable properties when heat and pressure is applied by a pressing device to the sublayer 5. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®.

A preferred amount of plasticizer in the sublayer 5 is 1-30 wt. %, or 3-15 wt. %.

Another way of providing the sublayer 5 with its plastically deformable properties is to use different types of polymers in the sublayer material blend. One example is to have a sublayer material blend comprising a PVC/PVAc co-polymer. The thermoforming ability increases with a higher PVAc content in the material blend. A preferred PVAc content in such a sublayer material blend may be 1-20 wt. %.

PVC/PVAc co-polymers are known and often used within the field of vinyl records, adhesives, carpet backings, different film and sheet applications to name some.

The sublayer 5 preferably has a thickness of 0.1-2 mm, more preferably a thickness of 0.2-1 mm, and even more preferably a thickness of 0.3-0.7 mm. The thickness of course affects how deep the embossing is allowed to be before reaching the core 3, but due to other aspects such as cost, material consumption, weight of the building panel etc. the thickness of the sublayer 5 is preferably within the presented ranges. In an embodiment, when a sublayer is plastically deformed during a manufacturing process, such as an embossing, depressions may be formed in the sublayer. The depth of the depressions may be at least 50% of the thickness of the sublayer, such as least 60%, such as at least 70%. The depth of the depressions may be at least 0.1 mm, such as at least 0.2 mm, such as at least 0.3 mm, such as at least 0.5 mm, such as at least 0.7 mm, such as at least 1 mm, such as at least 1.5 mm.

On the side of the plastically deformable sublayer 5 opposite the core 3 the surface layer 6 is arranged. The surface layer 6 may be a single layer or a multi-layer.

The surface layer 6 comprises at least one or more of a thermoplastic material, a thermoset material or a combination thereof. Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the surface layer 6 may include a filler in order to lower the cost of the layer, to be reinforcing, to improve the processability or to provide better surface properties of the surface layer 6. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, such as 5-70 wt. %, more preferably 30-70 wt. %. By not having more than 70 wt. % organic filler the layer is less prone to swell but by having as much organic filler as possible the weight of the surface layer 6 and in turn the weight of the building panel is decreased. By having 30 wt. % or more of the organic filler in the surface layer 6 advantages like lower weight, lower price and less carbon footprint is achieved.

An inorganic filler may be calcium carbonate ($CaCO_3$), barium sulphate ($BaSO_4$), talc, and/or a combination thereof. E.g. calcium carbonate ($CaCO_3$) has the advantages of being cost efficient, accessible and easy to handle.

Further, the surface layer 6 may include plastisol which gives the surface layer 6 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the surface layer 6 may include a plasticizer, providing the surface layer 6 with plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®.

A preferred amount of plasticizer in the sublayer 5 is 1-30 wt. %, or 3-15 wt. %.

Another way of providing the surface layer 6 with its plastically deformable properties is to use different types of polymers in the surface layer material blend. One example is to have a surface layer material blend comprising a PVC/PVAc co-polymer. The thermoforming ability increases with a higher PVAc content in the material blend. A preferred PVAc content in such a surface material blend may be 1-20 wt. %.

Figure 3:
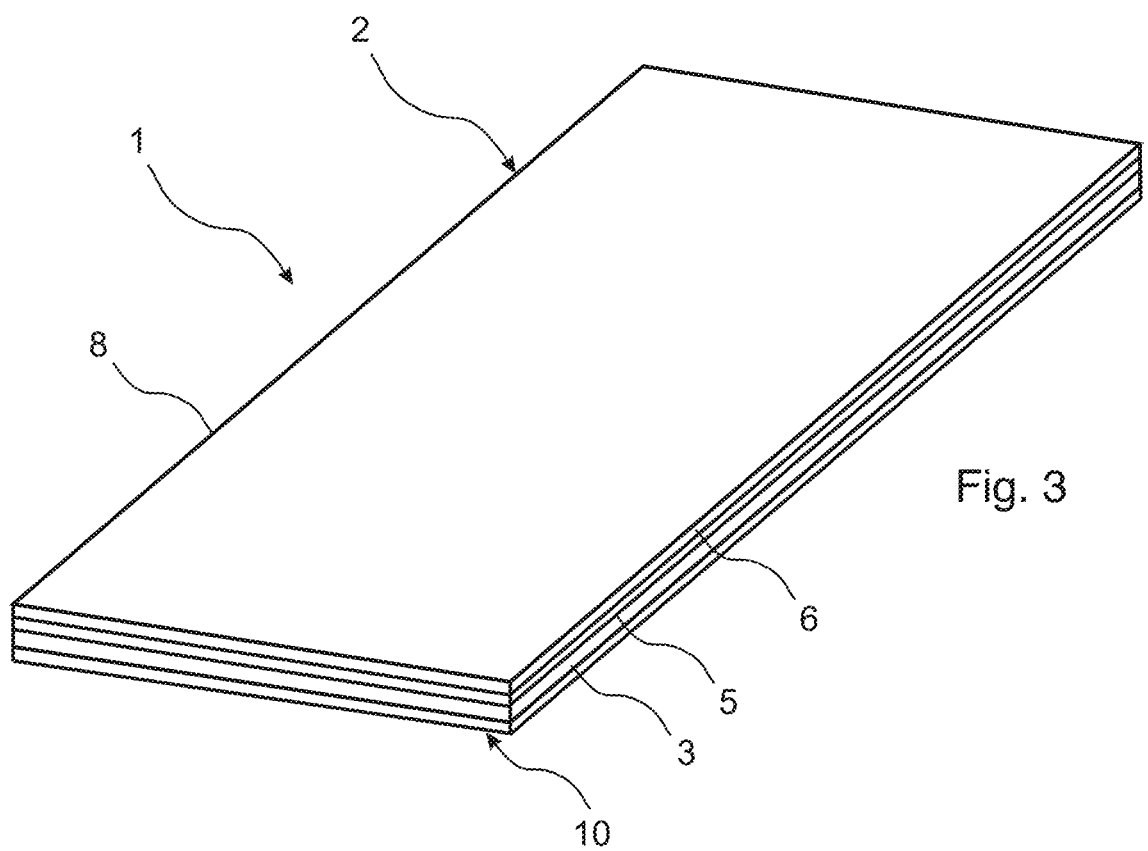
FIG. 3 illustrates a building panel with a décor layer according to an embodiment of the inventive concept, FIGS. 4a-4b schematically illustrate a method to produce the building panel without a balancing layer according to an embodiment of the present inventive concept, FIGS. 5a-5b schematically illustrate a method to produce the building panel in FIG. 1, with a balancing layer according to an embodiment of the present inventive concept, FIGS. 6a-6b schematically illustrate a method to produce a building panel without a balancing layer, according to an embodiment of the present inventive concept, FIGS. 7a-7b schematically illustrate a method to produce a building panel with a balancing layer, according to an embodiment of the present inventive concept, FIG. 8a schematically illustrate a method to produce an embossed surface of a building panel, according to an embodiment of the present inventive concept, FIG. 8b schematically illustrate a detailed view of an embossed surface in FIG. 8a, FIG. 9 is a photo of a reference building panel known in the art.

The surface layer 6 may either be a homogeneous layer or comprise two or more layers in turn. The surface layer 6 may be seen as the top layer facing the user as the building panel 1 is installed. Due to the surface layer 6 facing the user it may include a décor layer 8. An example is illustrated in FIG. 3. The décor layer 8 may be a coloured powder layer, a paper sheet, a polymer-based sheet, a wood-based veneer, a cork-based veneer, a fabric, woven or non-woven, or a print layer.

The surface layer 6 of the layer arrangement 2 is preferably a plastically deformable surface layer. This facilitates the manufacturing process as the building panel 1 may be pressed and embossed in the same process step, i.e., the plastically deformable sublayer 5 and the surface layer 6 may be embossed simultaneously. This could also be beneficial if a décor layer 8, as presented above, is present, as an embossing could amplify the decorative pattern of a décor layer 8. One example of a decorative pattern which would benefit from an embossing is a décor, e.g., a sheet, imitating a wood veneer with veins, cracks and other natural features of wood.

Further, the surface layer 6 may include a protective layer (not shown) such as a lacquer or similar.

Yet further, the surface layer 6 may include a wear layer 9, which can be seen in FIGS. 10-17. The wear layer may either be a thermoplastic foil or a layer having wear resistant particles and/or scratch resistant particles. An example of such wear resistant particles and/or scratch resistant particles are aluminum oxide particles.

In order to give the layers their desired features, either the sublayer 5, the surface layer 6 or both may comprise a thermosetting binder. Examples of a thermosetting binder are amino resins, for example melamine formaldehyde, urea formaldehyde or a combination thereof, or co-polymers. In an alternative embodiment a décor layer 8 of the surface layer 6, e.g. a paper sheet, may be impregnated with a thermosetting binder.

Figure 2:
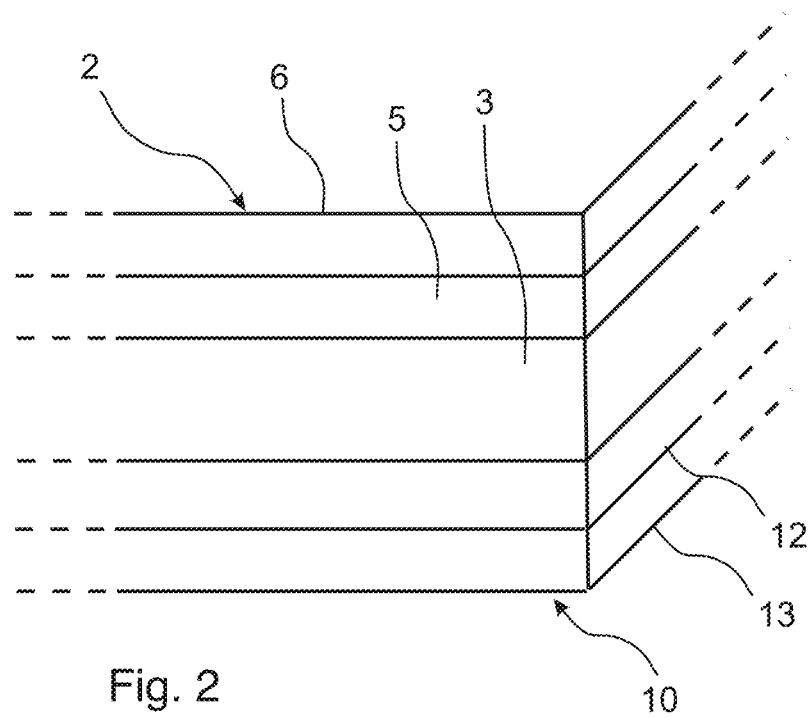
FIG. 2 illustrates a detailed view of the building panel in FIG. 1.

The building panel 1 may, as illustrated in FIGS. 1-3, include a second layer arrangement 10, arranged on the other side of the core 3, opposite the first layer arrangement 2, described above. The second layer arrangement 10 is arranged on other side of the core 3, being the lower or rear side, facing away from the user when the building panel 1 is installed, as illustrated in the figures. The second layer arrangement 10 may comprise a balancing layer and may include either one or more layers.

As illustrated in FIGS. 1-2, the lower layer arrangement 10 include two layers, an optional fourth layer, from now on called the second sublayer 12, and a fifth layer from now on called the second surface layer 13. The second sublayer 12 is located between the core 3 and the second surface layer 13. The second sublayer 12 may correspond to the first sublayer 5, described above, arranged on the opposite side of the first layer 3. Thus, all embodiments and feature of the first sublayer 5 are applicable for the second sublayer 12. Like the first sublayer 5 the second sublayer 12 is preferably configured to be plastically deformable.

Having a plastically deformable sublayer 12 and/or a plastically deformable surface layer 13 may create a better friction towards a surface on which the building panel 1 is to be installed, making the installation easier.

At the same time, the second sublayer 12 and the second surface layer 13 may form a balancing layer for balancing the building panel 1 and providing durability and strength to the building panel 1 and preventing thermal and hygroscopic movements of the panel 1.

The second sublayer 12 comprises at least one or more of a thermoplastic material, a thermoset material or a combination thereof. These types of materials are known being deformable in an embossing process from one side without affecting the other side of the layer, i.e., the side in contact with the core.

Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the second sublayer 12 may include a filler in order to lower the cost of the layer, to lower the weight of the layer, to be reinforcing, to improve the processability, to the reduce the risk of movement in the material of the layer, and/or to provide better surface properties of the second sublayer 12. The filler may be at least one or more of an organic filler, an inorganic filler, or a combination thereof.

An organic filler may be wood flour and/or rice husks. It may also be a filler made of coconut, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the second layer 12 and in turn the weight of the building panel is decreased. By having 30 wt. % or more of the organic filler in the second sublayer 12 advantages like lower weight, lower price and less carbon footprint is achieved.

An inorganic filler may be calcium carbonate ($CaCO_3$), barium sulphate ($BaSO_4$), talc, and/or a combination thereof. E.g., calcium carbonate ($CaCO_3$) has the advantages of being cost efficient, accessible and easy to handle. A preferred amount of calcium carbonate ($CaCO_3$) as a filler in the second sublayer 12 is 1-80 wt. %.

Further, the second sublayer 12 may include plastisol which gives the second sublayer 12 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the second sublayer 12 may include a plasticizer, providing the sublayer 5 with the plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM, or Pevalen®. A preferred amount of plasticizer in the sublayer 5 is 1-30 wt. %, or 3-15 wt. %.

Another way of providing the second sublayer 12 with its plastically deformable properties is to use different types of polymers in the sublayer material blend. One example is to have a sublayer material blend comprising a PVC/PVAc co-polymer. The thermoforming ability increases with a higher PVAc content in the material blend. A preferred PVAc content in such a sublayer material blend may be 1-20 wt. %.

The second sublayer 12 preferably has a thickness of 0.1-2 mm, more preferably a thickness of 0.2-1 mm, and even more preferably a thickness of 0.3-0.7 mm. The thickness of course affects how deep the embossing is allowed to be before reaching the core 3, but due to other aspects such as cost, material consumption, weight of the building panel, etc., the thickness of the second sublayer 12 is preferably within the presented ranges.

On the side of the second sublayer 12 opposite the core 3 the second surface layer 13 is arranged. The second surface layer may be a single-layer or a multi-layer. The second surface layer 13 may correspond to the first surface layer 6, described above, arranged on the opposite side of the first layer 3. Thus, all embodiments and feature of the first surface layer 6 are applicable for the second surface layer 13. Like the first surface layer 6 the second surface layer 13 is preferably configured to be plastically deformable.

The second surface layer 13 comprises at least one or more of a thermoplastic material, a thermoset material or a combination thereof. Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the second surface layer 13 may include a filler in order to lower the cost of the layer, to lower the weight of the layer, to be reinforcing, to improve the processability, to reduce the risk of movement in the material of the layer and/or to provide better surface properties of the second surface layer 13. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the second surface layer 13 and in turn the weight of the building panel is decreased. By having 30 wt. % or more of the organic filler in the second surface layer 13 advantages like lower weight, lower price and less carbon footprint is achieved.

An inorganic filler may be calcium carbonate ($CaCO_3$), barium sulphate (BaSO4), talc, and/or a combination thereof. E.g., calcium carbonate (CaCO3) has the advantages of being cost efficient, accessible and easy to handle.

Further, the second surface layer 13 may include plastisol which gives the surface layer 6 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the second surface layer 13 may include a plasticizer, providing the surface layer 13 with plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®.

A preferred amount of plasticizer in the sublayer 5 is 1-30 wt. %, or 3-15 wt. %.

Another way of providing the second surface layer 13 with its plastically deformable properties is to use different types of polymers in the surface layer material blend. One example is to have a surface layer material blend comprising a PVC/PVAc co-polymer. The thermoforming ability increases with a higher PVAc content in the material blend. A preferred PVAc content in such a surface layer material blend may be 1-20 wt. %.

The second surface layer 13 may either be a homogeneous layer or comprise two or more layers in turn. Since the second surface layer 13 is located on the rear side of the building panel 1, facing away from the user, a décor layer is probably not necessary but of course possible if desirable. As described above a décor layer may be a coloured powder layer, a paper sheet, a polymer-based sheet, a wood-based veneer, a cork-based veneer, a fabric, woven or non-woven, or a print, printed directly on the core 3. However, in alternative embodiments, a powder layer, a paper sheet, a polymer-based sheet, a wood-based veneer, a cork-based veneer or a fabric, woven or non-woven, may be used, maybe not primarily for its appearance but for its strength and advantageous features to form a desirable balancing layer.

The second surface layer 13 of the second layer arrangement 10 is preferably a plastically deformable surface layer. This facilitates the manufacturing process as the building panel 1 may be pressed and optionally embossed in the same process step, i.e. the second sublayer 12 and the second surface layer 13 may be pressed and optionally embossed simultaneously.

In order to give the layers of the second layer arrangement 10 their desired feature either the second sublayer 12, the second surface layer 13 or both may comprise a thermosetting binder. Examples of a thermosetting binder are amino resins, for example, melamine formaldehyde, urea formaldehyde or a combination thereof, or co-polymers. In an alternative embodiment, the second surface layer 13 may, e.g., be a paper sheet impregnated with a thermosetting binder.

In an alternative embodiment, the second layer arrangement comprises only a single layer, which preferably is a plastically deformable layer. This may be preferred when a shallower embossing is preferred, or no embossing at all.

FIGS. 4a-4b and 6a-6b schematically illustrate a manufacturing processes for making a building panel 1 as presented above. A method to manufacture the building panel 1, such as a floor panel, comprising:

joining a first material and a second material to form a first layer 3 and a second layer 5 of a semi-finished panel 1', wherein the first material comprises at least one or more of a thermoplastic material, a thermoset material, a mineral based material or a combination thereof, applying a third layer 6 on the second layer 5, and applying heat and pressure to form the building panel 1, wherein the first layer 3 forms a core of the building panel 1 and the third layer forms a surface layer of the building panel 1, and wherein the second layer 5 forms a sublayer between the first layer 3 and the third layer 6, wherein the second layer 5 is configured to at least partly be plastically deformed when heat and pressure is applied.

The first layer 3 is after the manufacturing process the core 3, as described above, or the finished building panel 1. The second layer 5 is during and after the manufacturing process the plastically deformable sublayer 5, as described above, of the finished building panel. The third layer 6 is after the manufacturing process the surface layer 6, as described above, of the finished building panel 1.

The second layer 5 is plastically deformable when heat and pressure are, e.g. during the manufacturing process to form the building panel 1.

A plastically deformable layer is one where the shape of the layer may be changed under the application of heat and pressure, and the changed shape may be maintained during and after the application of heat and pressure. For example, depressions and/or elevations, may be formed in the material of a plastically deformable layer by application of heat and pressure, and the depressions and/or elevations may be maintained during and after the application of heat and pressure. A plastically deformable layer may be considered sufficiently plastically deformable when a depression of 0.04 mm is formed when an embossing plate with a rill of 1.2 mm depth and a base width of 2 mm is pressed against the layer at a pressure of 20 bar and a temperature of 80° C. for 35 seconds. In further embodiments, a plastically deformable layer may be considered sufficiently plastically deformable when a depression of 0.06 mm, such as 0.08 mm, such as 0.1 mm, such as 0.12 mm is formed when an embossing plate with a rill of 1.2 mm depth and a base width of 2 mm is pressed against the layer at a pressure of 20 bar and a temperature of 80° C. for 35 seconds.

In a method of manufacturing, a controlled embossing may form depressions and/or elevations with a pressing occurring within a temperature range of 10-300° C., such as 50-220° C., such as 75 and 180° C. and with pressure range of 1-100 bar, such as 1-50 bar, such as 1-30 bar, for a time period of 0.1-500 seconds, such as 0.5-300 seconds, such as 1-60 seconds.

In other embodiments, a plastically deformable layer may be considered sufficiently plastically deformable when the plastically deformable layer is more plastically deformable than the core layer. That is, a deeper depression is formed in the plastically deformable layer, as compared to a depression formed in the core, when each are pressed with an embossing plate with a rill of 1.2 mm depth and a base width of 2 mm at a pressure of 20 bar and a temperature of 80° C. for 35 seconds. For example, the depression in the plastically deformable layer may be at least 10% deeper, such as at least 25% deeper, such as at least 50% deeper than a depression formed in the core when each are pressed with an embossing plate with a rill of 1.2 mm depth and a base width of 2 mm at a pressure of 20 bar and a temperature of 80° C. for 35 seconds.

A preferred temperature used in the method for manufacturing the building panel 1 is between 75 and 180° C. and a preferred pressure is between 1 and 30 bar, during a period of time of between 30 and 60 sec. These parameter ranges are applicable for every type of plastically deformable sublayer, i.e. sublayer including plasticizer and sublayer with different co-polymers in order to create the plastically deformable feature of the sublayer, as described above. However, generally the necessary press parameters when having different co-polymers in the plastically deformable sublayer are lower than when using a plasticizer, e.g. the temperature range may be 75-160° C. Further, these parameters are desired when using a short cycle press, schematically illustrated in FIGS. 4a and 4b. In another type of press, for example a double belt press, schematically illustrated in FIGS. 5a and 5b, the desirable parameters are similar to the short cycle press, but possibly within the lower ranges of the press parameters. A double belt press may be preferred to use due to its capacity and speed when producing such building panels.

Figure 6A:
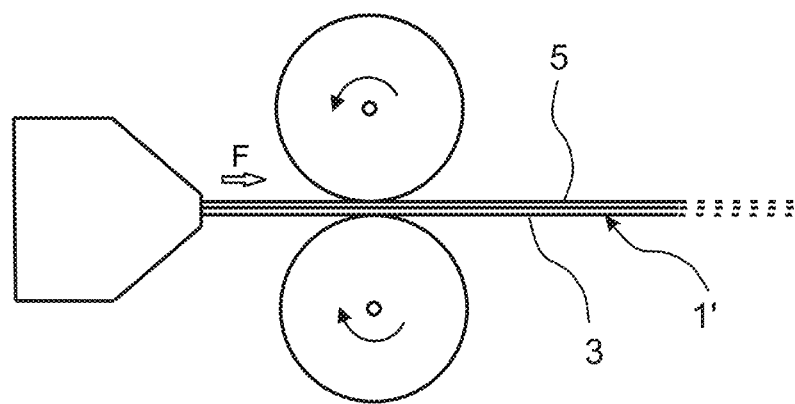
Figure 6B:
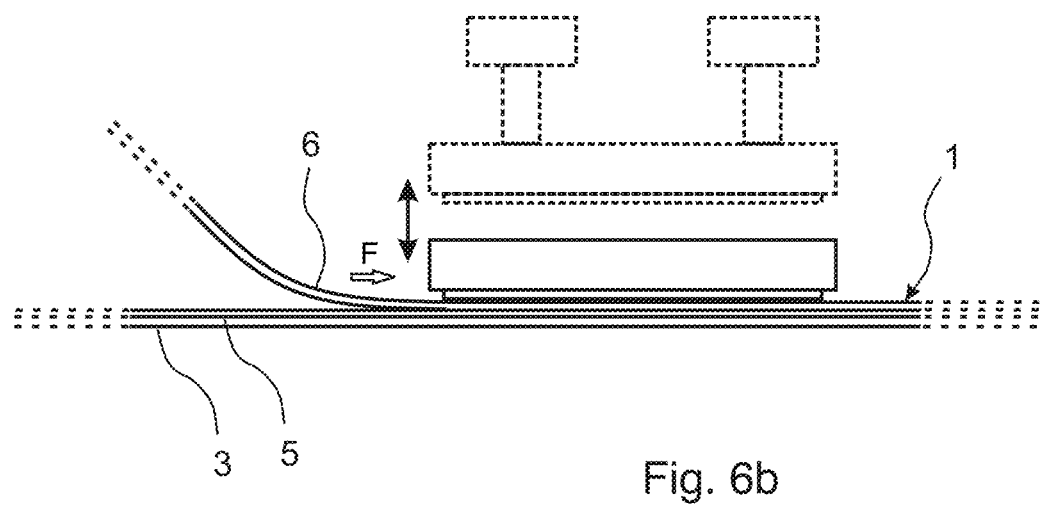
Figure 7A:
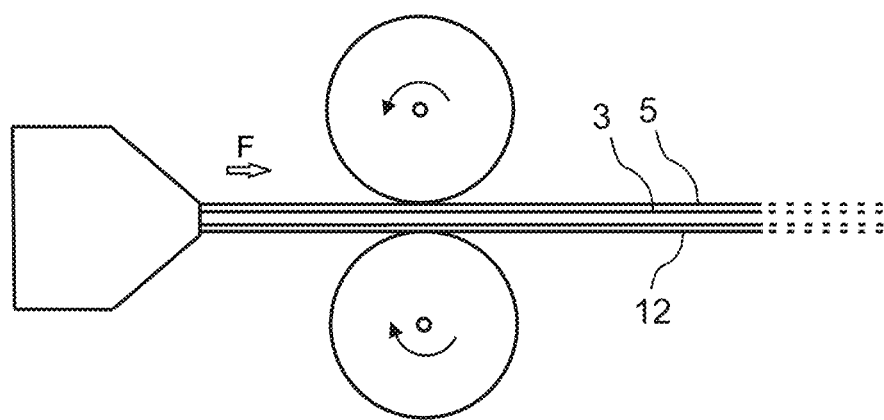
Figure 7B:
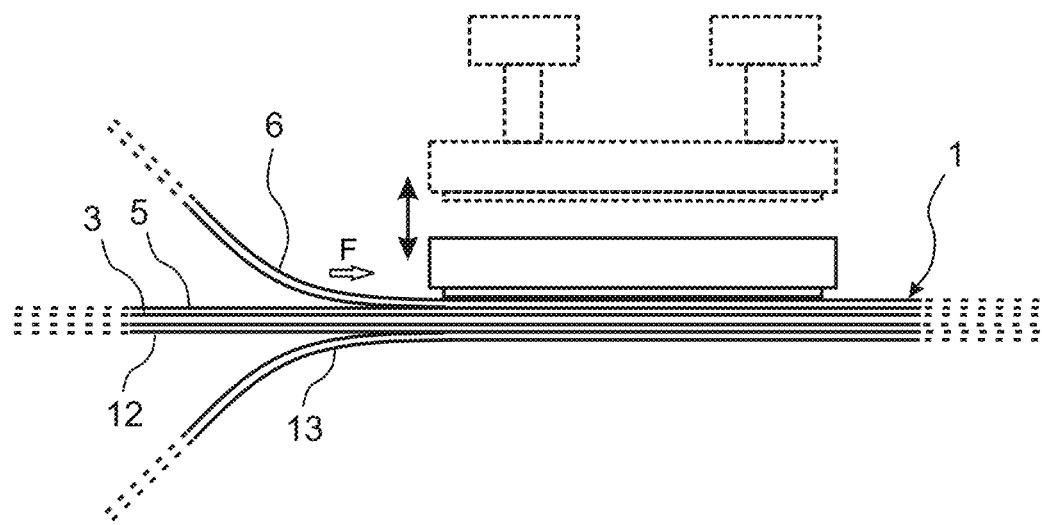

In further embodiments, the pressing process may include either a continuous pressing process or a discontinuous pressing process, schematically illustrated in FIGS. 6b and 7b. The pressing process may further include a stationary or mobile pressing device.

In an embodiment the joining of the first material and the second material may be made by an extrusion process, co-extrusion process and/or calendaring process to form the semi-finished panel 1', schematically illustrated in FIGS. 6a and 7a.

In an alternative embodiment the joining of the first material and the second material is made by a pressing process. The pressing process may include either a continuous pressing process or a discontinuous pressing process. The pressing process may further include a stationary or mobile pressing device.

Figure 8A:
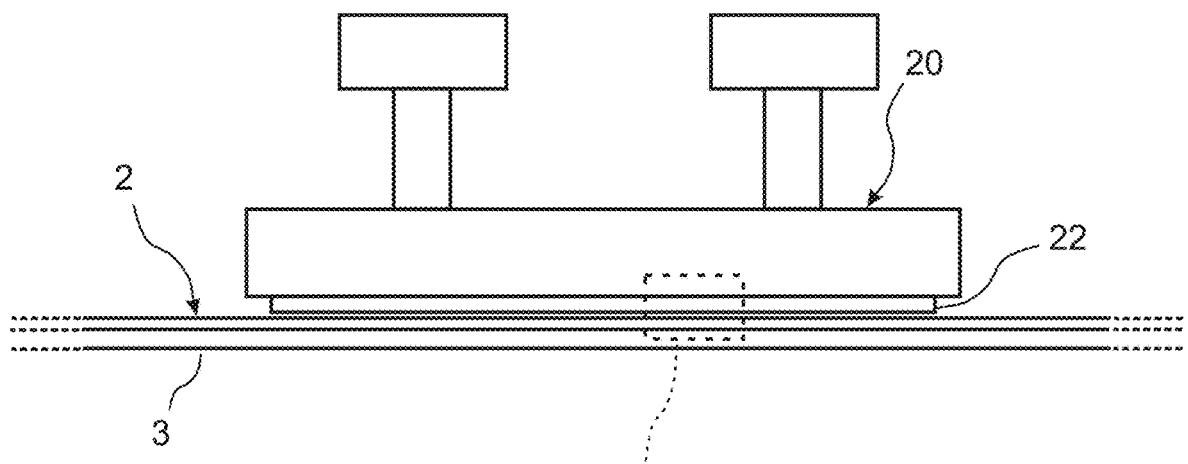
Figure 8B:
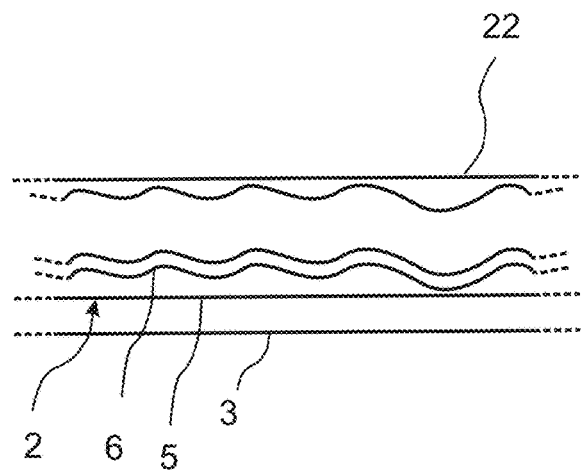

The method further comprises:
  embossing the second layer 5 of the semi-finished panel 1' before applying the third layer 6, or
  embossing the second layer 5 and the third layer 6, illustrated in FIGS. 8a and 8b.

In the first alternative, the embossing is made when forming the semi-finished product 1', i.e. before applying the third layer 6. In the second alternative, the embossing is preferably made simultaneously with the applying of heat and pressure when forming the building panel 1. Yet another alternative, is that the second layer is pre-embossed before joining it with the first layer 3.

The embossing may be made by any suitable embossing process, e.g. by means of embossing plates, embossing rolls, or the like.

Generally, every layer is in some sense formable under heat and pressure as it depends on the temperature and applied pressure but in the described process it is desirable to achieve a controlled embossing within the preferred heat range of between 75 and 180° C. and preferred pressure range of between 1 and 30 bar, during a period of time of between 30 and 60 sec. This means that if we want the embossing to be applied to both the second layer 5 and the third layer 6 the third layer 6 may be deformable, preferably plastically deformable, in the same sense as the second layer 5. Thus, the material and the layer properties of the third layer will be chosen such that a controlled and desirable embossing may be achieved.

The first layer forms the core 3 of the finished building panel 1. The first material forming the first layer 3 comprises at least one or more of a thermoplastic material, a thermoset material, a mineral based material or a combination thereof.

Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof.

A first material based on a thermoplastic material may include at least 10 wt %, at least 15 wt % or at least 20 wt % of the thermoplastic material. Such first material may further include an inorganic filler of at least 50 wt %, at least 60 wt % or at least 65 wt %. Such a first material may further include additives.

A SPC layer, which may be included in the inventive concept of the application, may include 10-40 wt %, 15-35 wt %, or 20-30 wt % of a thermoplastic material, such as PVC. The SPC layer may further include 50-90 wt %, 60-80 wt % or 65-75 wt % of an inorganic filler, such as chalk. The SPC layer may further include 0-20 wt %, 1-15 wt % or 2-10 wt % of additives, such as impact modifier, stabilizer, lubricant and/or pigment.

A LVT type of layer would have a similar content of material as the SPC layer above, i.e. 10-40 wt %, 15-35 wt %, or 20-30 wt % of a thermoplastic material, 50-90 wt %, 60-80 wt % or 65-75 wt % of an inorganic filler and 0-20 wt %, 1-15 wt % or 2-10 wt % of additives, but with the addition of 1-20 wt %, 2-15 wt % or 3-10 wt % of a plasticizer.

Examples of suitable thermoset material are epoxy, polyurethane, cross-linked polyethylene (PEX), amino plastics, phenolic plastics, acrylates and/or a combination thereof.

A first material based on a thermoset material may include 10-70 wt %, 20-60 wt % or 25-50 wt % of a thermoset resin, such as aminoplastics, polyurethanes, phenoplastics, epoxy or acrylics. Such a first material may further include 0-70 wt %, 10-70 wt % or 20-70 wt % of a filler, such as an inorganic filler. Such a first material may further include one or more additives, such as impact modifier, stabilizer, lubricant and/or pigment.

An example of a suitable mineral based material is magnesium oxide (MgO), magnesium chloride (MgCl2), magnesium sulfate (MgSO4), or sand. A first material based on these types of mineral materials may further include 1-20 wt % or 5-15 wt % filler, such as an organic filler e.g. wood fibres.

Another type of suitable mineral based material is e.g. Portland cement. A first material based on this type of mineral material, which may be called a fibre cement material, may further include sand and/or 1-20 wt % or 5-15 wt % filler, such as an organic filler e.g. wood fibres.

A first material based on a mineral based material may include at least 50 wt %, at least 60 wt %, at least 70 wt %, or at least 80 wt % of the mineral based material.

The first material may further include a filler, as described above in the examples of each material or layer type. The filler may be an organic filler, an inorganic filler or a combination thereof. Examples of an inorganic fillers are calcium carbonate ($CaCO_3$), barium sulphate ($BaSO_4$), or talc and/or a combination thereof. The first material may comprise, e.g., more than 50 wt % of such an inorganic filler, or even more than 70 wt % of such a filler. An example of an organic filler is wood fibres, as described above.

The second layer 5 forms the plastically deformable sublayer, as described above, of the building panel 1. The second material, forming the second layer 5, comprises at least one or more of a thermoplastic material, a thermoset material, or a combination thereof. These types of materials are known being deformable in an embossing process from one side without affecting the other side of the layer, i.e. the side in contact with the core. A purpose of the second layer 5 is to allow embossing of the building panel 1 which is deeper than the thickness of the third layer 6, without affecting or damaging the first layer 3, thus an advantage with the second layer 5 is that the first layer 3 is protected during the manufacturing process. Another advantage with the second layer 5, having plastically deformable properties, is that it may increase the appearance of a third layer 6, and thus the design of the building panel 1, having a decorative pattern which is intensified by a deeper embossing, e.g. a wood-like pattern with veins and cracks etc.

Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the second layer 5 may include a filler in order to lower the cost of the layer, to lower the weight of the layer, to be reinforcing, to improve the processability, to reduce the risk of movement in the material of the layer, and/or to provide better surface properties of the second layer 5. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the second layer 5 and in turn the weight of the building panel 1 is decreased. By having 30 wt. % or more of the organic filler in the second layer 5 advantages like lower weight, lower price and less carbon footprint is achieved.

An inorganic filler may be calcium carbonate ($CaCO_3$), barium sulphate (BaSO4), talc, and/or a combination thereof. E.g. calcium carbonate (CaCO3) has the advantages of being cost efficient, accessible and easy to handle. A preferred amount of calcium carbonate ($CaCO_3$) as a filler in the second layer 5 is 1-80 wt %.

Further, the second layer 5 may include plastisol which gives the layer 5 soft and durable properties. Plastisol is a suspension of polyvinyl chloride (PVC) or other polymer particles in a liquid plasticizer. The sublayer may include 30-70 wt % or 40-60 wt % of such a type of plasticizer.

It is desirable when forming the building panel to both have a sublayer between the surface layer and the core in order to produce a deeper embossing than what may be achieved in a commonly used building panel, see FIG. 9, and also have a sublayer provided with better thermoforming abilities in order to be able to form the embossing with preferably lower pressure and/or lower temperature and/or during shorter time in the pressing device than what is used today.

One way of providing the second layer 5 with the preferred thermoforming abilities, to provide the second layer 5 with plastically deformable properties is to include a plasticizer to the second layer 5, providing the second layer 5 with the plastically deformable properties when heat and pressure is applied by a pressing device to the second layer 5. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®.

A preferred amount of plasticizer in the second layer 5 is 1-30 wt. %, or 3-15 wt. %.

Another way of providing the second layer 5 with its plastically deformable properties is to use different types of polymers in the layer material blend. One example is to have a layer material blend with a PVC/PVAc co-polymer. The thermoforming ability increases with a higher PVAc content in the material blend. A preferred PVAc content in such a layer material blend may be 1-20 wt. %.

PVC/PVAc co-polymers are known and often used within the field of vinyl records, adhesives, carpet backings, different film and sheet applications to name some. The second layer 5 preferably is applied with a thickness of 0.1-2 mm, more preferably a thickness of 0.2-1 mm, and even more preferably a thickness of 0.3-0.7 mm. The thickness of course affects how deep the embossing is allowed to be before reaching the first layer 3, but due to other aspects such as cost, material consumption, weight of the building panel etc. the thickness of the second layer 5 is preferably within the presented ranges.

In an embodiment the joining of the first material and the second material may be made by an extrusion process, co-extrusion process and/or calendaring process to form the semi-finished panel 1', see FIG. 6a.

Figure 4A:
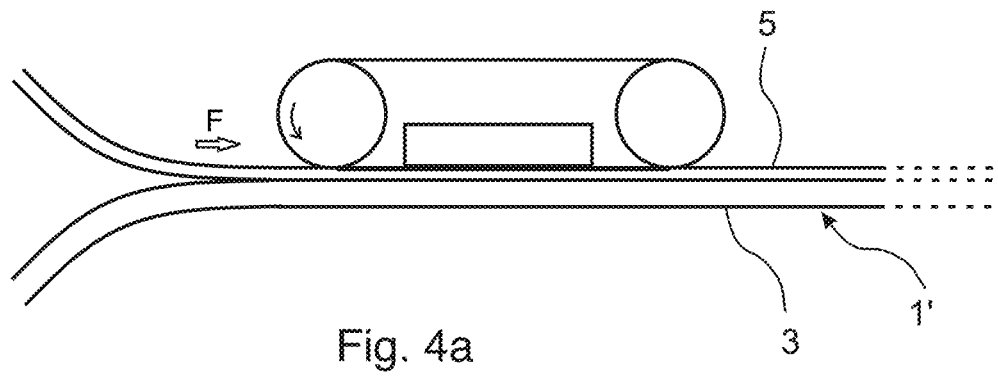
Figure 4B:
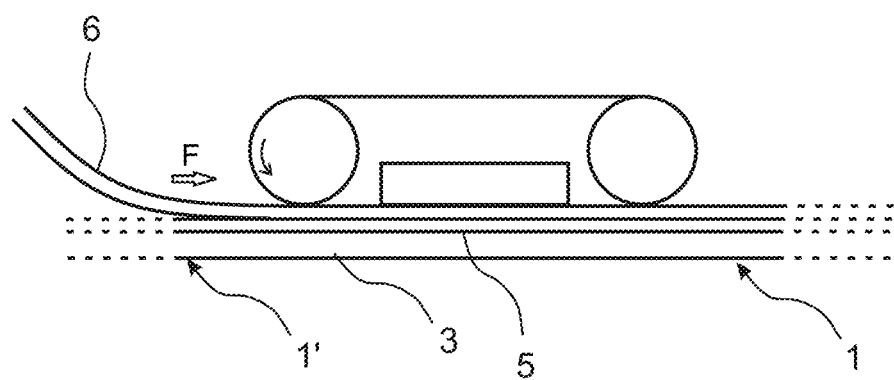

In an alternative embodiment the joining of the first material and the second material is made by a pressing process, see FIG. 4a. The pressing process may include either a continuous pressing process or a discontinuous pressing process. The pressing process may further include a stationary or mobile pressing device.

The third layer 6, which is applied to the second layer 5, forms a surface layer of the building panel 1. The third layer 6 comprises at least one or more of a thermoplastic material, a thermoset material or a combination thereof. Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the third layer 6 may include a filler in order to lower the cost of the layer, to lower the weight of the layer, to be reinforcing, to improve the processability, to reduce the risk of movements in the material of the layer, and/or to provide better surface properties of the third layer 6. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the third layer 6 and in turn the weight of the building panel is decreased. By having 30 wt. % or more of the organic filler in the third layer 6 advantages like lower weight, lower price and less carbon footprint is achieved.

An inorganic filler may be calcium carbonate ($CaCO_3$), barium sulphate (BaSO4), talc, and/or a combination thereof. E.g. calcium carbonate (CaCO3) has the advantages of being cost efficient, accessible and easy to handle.

Further, the third layer 6 may include plastisol which gives the surface layer 6 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the third layer 6 may include a plasticizer, providing the third layer 6 with plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. A preferred amount of plasticizer in the third layer 6 is 1-30 wt. %, or 3-15 wt. %.

Another way of providing the third layer 6 with its plastically deformable properties is to use different types of polymers in the layer material blend. One example is to have a layer material blend comprising a PVC/PVAc co-polymer. The thermoforming ability increases with a higher PVAc content in the material blend. A preferred PVAc content in such a layer material blend may be 1-20 wt. %.

The third layer 6 may either be a homogeneous layer or comprise two or more layers in turn. The third layer 6 may be seen as the top layer facing the user as the building panel 1 is installed. Due to the third layer 6 facing the user, it may include a décor layer 8. An example is illustrated in FIG. 3. The décor layer 8 may be a coloured powder layer, a paper sheet, a polymer-based sheet, a wood-based veneer, a cork-based veneer or a fabric, woven or non-woven.

The third layer 6 is preferably a plastically deformable layer. This facilitates the manufacturing process as the building panel 1 may be pressed and embossed in the same process step, i.e. the second layer 5 and the third layer 6 may be embossed simultaneously. This could also be beneficial if a décor layer 8, as presented above, is present, as an embossing could amplify the decorative pattern of a décor layer 8. One example of a decorative pattern which would benefit from an embossing is a décor, e.g. a sheet, imitating a wood veneer with veins, cracks and other natural features of wood.

Further, the third layer 6 may include a protective layer (not shown) such as a lacquer or similar.

Yet further, the third layer 6 may include a wear layer 9, which can be seen in FIGS. 10-17. The wear layer may either be a thermoplastic foil or a layer having wear resistant particles and/or scratch resistant particles. An example of such wear resistant particles and/or scratch resistant particles are aluminum oxide particles.

In order to give the layers their desired features, either the second layer 5, the third layer 6 or both may comprise a thermosetting binder. Examples of a thermosetting binder are amino resins, for example melamine formaldehyde, urea formaldehyde or a combination thereof, or co-polymers. In an alternative embodiment a décor layer 8 of the third layer 6, e.g. a paper sheet, may be impregnated with a thermosetting binder.

Figure 5A:
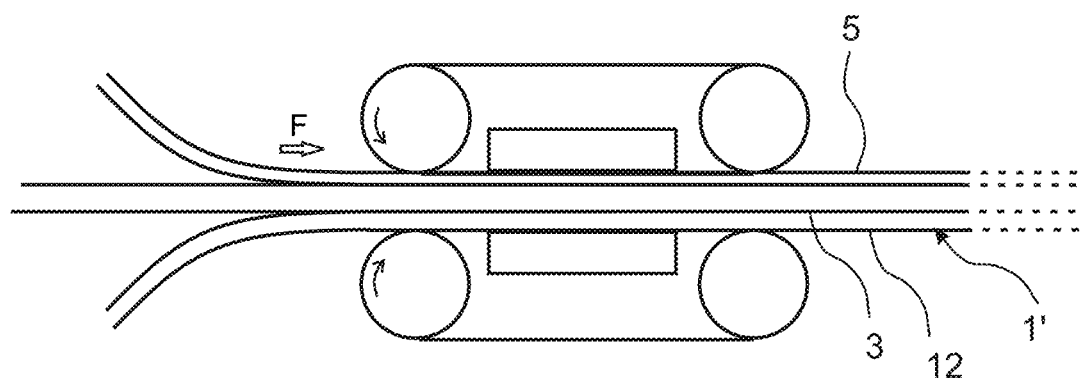
Figure 5B:
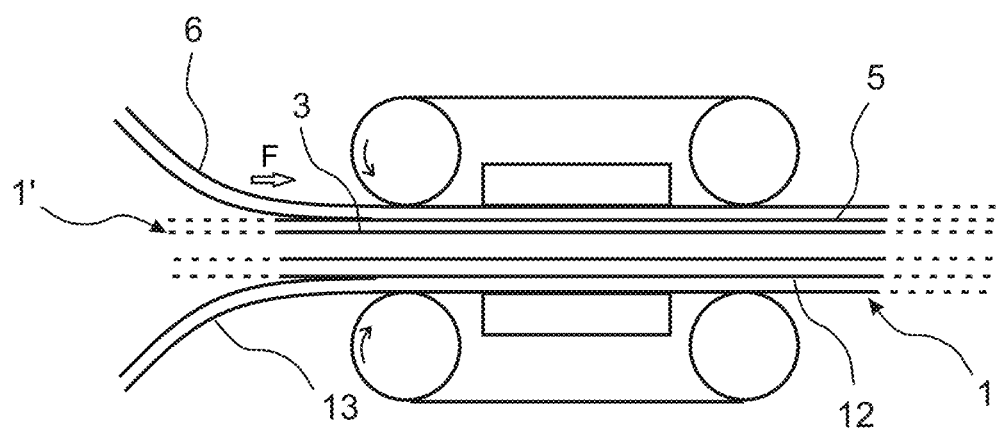

As illustrated in FIGS. 5a and 5b, the method may further comprise:
 joining a fourth material with the first material, opposite the second material, to form a fourth layer 12 with the first layer 3, wherein said fourth layer 12 forms a balancing layer of said building panel 1, or
 applying a fourth layer 12 on the first layer 3 opposite the second layer 5, wherein said fourth layer 12 forms a balancing layer of said building panel 1

In the first alternative, the fourth material, forming the fourth layer 12, may be joined with the first material, forming the first layer 3, in an extrusion process, co-extrusion process and/or calendaring process, see FIG. 7a. In the second alternative, the fourth layer 12 may be applied to the first layer, on the opposite side of the second layer 5, by any suitable process, such as a pressing process, see FIG. 5a. The fourth layer 12 may be joined or applied to the first layer 3 simultaneously with at least the second layer 5 or in a separate process step, thus the fourth layer may be joined with the first material either before, during or after the second material is joined with the first material.

The fourth layer 12 is preferably the second plastically deformable layer, as described above, of the building panel 1, located on the rear side of the building panel 1. It is often desirable to have at least one, preferably plastically deformable, layer on the rear side of the building panel 1 as well, as panels are often marked or embossed with a logo, a marking or similar. The second plastically deformable sublayer 12 contribute to an appealing design of the logo or marking and at the same time protects the core 3 from an embossing.

Further, the plastically deformable layer 12 may create a better friction towards a surface on which the building panel 1 is to be installed, making the installation easier.

Also, the second sublayer 12 may form a balancing layer for balancing the building panel 1 and providing durability and strength to the building panel 1 and preventing thermal and hygroscopic movements of the panel 1.

The fourth layer 12 may correspond to the second layer 5 arranged on the opposite side of the first layer 3. Thus, all embodiments and feature of the second layer 5 are applicable for the fourth layer 12.

The fourth layer 12 comprises at least one or more of a thermoplastic material, a thermoset material or a combination thereof. These types of materials are known being plastically deformable in an embossing process from one side without affecting the other side of the layer, i.e. the side in contact with the core.

Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the fourth layer 12 may include a filler in order to lower the cost of the layer, to lower the weight of the panel, to be reinforcing, to improve the processability, to reduce the risk of movement in the material of the layer, and/or to provide better surface properties of the fourth layer 12. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the fourth layer 12 and in turn the weight of the building panel is decreased. By having 30 wt. % or more of the organic filler in the fourth layer 12 advantages like lower weight, lower price and less carbon footprint is achieved.

An inorganic filler may be calcium carbonate ($CaCO_3$) which has the advantages of being cost efficient, accessible and easy to handle. A preferred amount of calcium carbonate ($CaCO_3$) as a filler in the fourth layer 12 is 1-80 wt %.

Further, the fourth layer 12 may include plastisol which gives the fourth layer 12 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the fourth layer 12 may include a plasticizer, providing the sublayer 5 with plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. A preferred amount of plasticizer in the fourth layer 12 is 1-30 wt. %, or 3-15 wt. %.

Another way of providing the fourth layer 12 with its plastically deformable properties is to use different types of polymers in the layer material blend. One example is to have the layer material blend comprising a PVC/PVAc co-polymer. The thermoforming ability increases with a higher PVAc content in the material blend. A preferred PVAc content in such a layer material blend may be 1-20 wt. %.

The fourth layer 12 preferably has a thickness of 0.1-2 mm, more preferably a thickness of 0.2-1 mm, and even more preferably a thickness of 0.3-0.7 mm. The thickness of course affects how deep the embossing is allowed to be before reaching the core 3, but due to other aspects such as cost, material consumption, weight of the building panel etc. the thickness of the fourth layer 12 is preferably within the presented ranges.

In an alternative embodiment the fourth material is an already finished layer, such as a paper sheet, a polymer-based sheet, a wood-based veneer, a cork-based veneer or a fabric, woven or non-woven. The method would then comprise joining the fourth layer to the first material or first layer opposite the second material or the second layer, wherein said fourth layer forms a balancing layer of said building panel.

It may in alternative embodiments be possible to have several layers on the rear side of the building panel, preferably having plastically deformable properties, e.g. a second sublayer and a second surface layer, forming a lower layer arrangement 10. The lower layer arrangement 10 is similar to the upper layer arrangement 2 described for the front side of the building panel 1. If a logo or marking preferably is made with a deep embossing it may be preferred to have both a plastically deformable sublayer and a plastically deformable surface layer, as described above and illustrated in FIGS. 5a and 5b. Thus, the method may further comprise:

applying a fifth layer 13 on the fourth layer 12, such that the fourth layer is arranged between the first layer 3 and the fifth layer 13.

The fourth layer 12 and the fifth layer 13 are arranged on the other side of the first layer 3, opposite the second and third layer 5, 6. Applying the fifth layer 13 to the fourth layer 12 is preferably made by a pressing process, see FIGS. 5b and 7b. The pressing process may include either a continuous pressing process or a discontinuous pressing process. The pressing process may further include a stationary or mobile pressing device.

The fifth layer 13 may correspond to the third layer 6 arranged on the opposite side of the first layer 3. Thus, all embodiments and feature of the third layer 6 are applicable for the fifth layer 13.

The fifth layer 13 comprises at least one or more of a thermoplastic material, a thermoset material or a combination thereof. Examples of suitable thermoplastic materials are polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof. A thermoplastic material has the advantages of being easy to deform under the influence of heat and pressure.

Examples of suitable thermoset materials are epoxy, polyurethane, cross-linked polyethylene (PEX), amino plastics, phenolic plastics, acrylates and/or a combination thereof.

Further, the fifth layer 13 may include a filler in order to lower the cost of the layer, to lower the weight of the layer, to be reinforcing, to improve the processability, to reduce the risk of movement in the material of the layer, and/or to provide better surface properties of the fifth layer 13. The filler may be at least one or more of an organic filler, an inorganic filler, or a combination thereof.

An organic filler may be wood flour and/or rice husks. It may also be a filler made of coconut fibres, straw, flax or bagasse or the like. These types of organic fillers are often accessible and easy to get hold of to a favorable price. A preferred amount of an organic filler is 1-70 wt. %, more preferably 30-70 wt. %. By not having more than 70 wt. % organic filler the layer is less prone to swell but by having as much organic filler as possible the weight of the fifth layer 13 and in turn the weight of the building panel is decreased. By having 30 wt. % or more of the organic filler in the fifth layer 13 advantages like lower weight, lower price and less carbon footprint is achieved.

An inorganic filler may be calcium carbonate ($CaCO_3$) which has the advantages of being cost efficient, accessible and easy to handle.

Further, the fifth layer 13 may include plastisol which gives the layer 13 soft and durable properties. Plastisol is a suspension of polyvinyl chloride (PVC) or other polymer particles in a liquid plasticizer. The sublayer may include 30-70 wt % or 40-60 wt % of such a type of plasticizer.

Yet further, the fifth layer 13 may include a plasticizer, providing the fifth layer 13 with plastically deformable properties. The plasticizer may be chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. A preferred amount of plasticizer in the fifth layer 13 is 1-30 wt. %, or 3-15 wt. %.

Another way of providing the fifth layer 13 with its plastically deformable properties is to use different types of polymers in the layer material blend. One example is to have the layer material blend comprising a PVC/PVAc co-polymer. The thermoforming ability increases with a higher PVAc content in the material blend. A preferred PVAc content in such a layer material blend may be 1-20 wt. %.

The fifth layer 13 may either be a homogeneous layer or comprise two or more layers in turn. Since the fifth layer 13 is located on the rear side of the building panel 1, facing away from the user, a décor layer is probably not necessary but of course possible if desirable. As described above a décor layer may be a coloured powder layer, a paper sheet, a polymer-based sheet, a wood-based veneer, a cork-based veneer or a fabric, woven or non-woven. However, in alternative embodiments, a powder layer, a paper sheet, a polymer-based sheet, a wood-based veneer, a cork-based veneer or a fabric, woven or non-woven, may be used, maybe not primarily for its appearance but for its strength and advantageous features to form a desirable balancing layer.

The fifth layer 13 of the lower layer arrangement 10 is preferably a plastically deformable surface layer. This facilitates the manufacturing process as the building panel 1 may be laminated and embossed in the same process step, i.e. the fourth layer 12 and the fifth layer 13 may be embossed simultaneously.

In order to give the layers of the lower layer arrangement 10 their desired feature either the fifth layer 12, the fifth layer 13 or both may comprise a thermosetting binder. Examples of a thermosetting binder are amino resins, for example melamine formaldehyde, urea formaldehyde or a combination thereof, or co-polymers. In an alternative embodiment a décor layer of the fifth layer 13, e.g. a paper sheet, may be impregnated with a thermosetting binder.

The fourth layer 12 and fifth layer 13 will contribute to an appealing design of a logo or marking and at the same time protect the core 3 from a deep embossing. Also, the fourth layer 12 and the fifth layer 13 form a balancing layer for balancing the building panel 1 and providing durability and strength to the building panel 1.

Example

Below is the result of a test presented showing the correlation between the embossing, using a predetermined temperature, pressure and time, and the content of the sublayer.

A number of building panels having the same core, the same surface layer but sublayers with different amount of plasticizer were manufactured in a pressing device at a pressure of 20 bar, a temperature of 80° C. during 35 seconds. The pressing device is equipped with a top press plate having rills that are 1.2 mm. deep.

The depressions D created in the building panel by the press plate were then measured. The results as photos are to be seen in FIGS. 9-17. The results in number are to be seen in Table 2 below.

Two reference tests were made, one without any sublayer, see FIG. 9, having only the core 3 and the surface layer 6, including the print layer 8 and the wear layer 9. The other one having a sublayer 5, in between the core 3 and the surface layer 6, where the sublayer has no plasticizer in the blend, see FIG. 10.

The core 3 used in the test was a SPC core, commonly used within the field. The surface layer included a decorative print layer 8 and a wear layer 9, where the print layer 8 was arranged on top of the plastically deformable sublayer 5 and the wear layer 9 was arranged on top of the print layer 8.

For the testing, a PVC blend was mixed with different amount of a plasticizer. The main PVC blend receipt is defined in Table 1. Most of the blend consists of PVC (68.97%) and the inorganic filler chalk (22.07%).

TABLE 1

| | PVC blend recipe | |
| --- | --- | --- |
| Raw material | PHR (Parts per hundred resin) | Weight % |
| Norvinyl S5745 | 100 | 68.97% |
| Baerostab CT 1228 R | 10 | 6.90% |
| Baerolub PA Special | 2 | 1.38% |
| Baerolub PA 200 | 1 | 0.69% |
| Omyacarb 40 GU | 32 | 22.06% |
| Total: | 145 | 100% |

The PVC blend, according to Table 1, of 300 g was mixed with different amounts of plasticizer, according to Table 2. The plasticizer (Plast.) used for the test was Eastman 168. The depressions D of each test were measured, the depth value X of the depression is measured from the upper surface of the wear layer 9 in between two depressions D, to the bottom of the depression D, see the figures.

TABLE 2

| | Sublayer with different amount of plasticizer | | |
| --- | --- | --- | --- |
| Sublayer | Seen in FIG. | Weight % of Plasticizer | Depth of depression X (mm) |
| SPC core + no sublayer | 9 | — | 0.027 |
| PVC blend + no Plast. | 10 | 0 | 0.027 |
| PVC blend + 8 g Plast. | 11 | 2.6 | 0.041 |
| PVC blend + 20 g Plast. | 12 | 6.3 | 0.041 |
| PVC blend + 27 g Plast. | 13 | 8.3 | 0.069 |
| PVC blend + 40 g Plast. | 14 | 11.8 | 0.124 |
| PVC blend + 60 g Plast | 15 | 16.7 | 0.110 |
| PVC blend + 80 g Plast. | 16 | 21.1 | 0.110 |
| PVC blend + 100 g Plast. | 17 | 25.0 | 0.124 |

A conclusion to be drawn from the result of the tests, which also can be seen in the figures, is that a plasticizer in the material blend of the sublayer provide the sublayer with the desirable plastically deformable feature. Further, the depth of the depressions D in the building panel increases with the amount of plasticizer in the blend.

Illustrative Embodiment

Further aspects of the disclosure are provided below. Embodiments, examples, etc. of these aspects are largely analogues to the embodiments, examples, etc. as described above, whereby reference is made to the above for a detailed description.

Item 1. A building panel, such as a floor panel, comprising:
a core (3) comprising at least one or more of a thermoplastic material, a thermoset material, a mineral based material or a combination thereof,
a first layer arrangement (2), arranged on said core (3), comprising a surface layer (6) and a formable sublayer (5), wherein said formable sublayer (5) is arranged between said core (3) and said surface layer (6).

Item 2. The building panel according to item 1, wherein said formable sublayer (5) comprising at least one or more of a thermoplastic material, a thermoset material or a combination thereof.

Item 3. The building panel according to item 1 or 2, wherein said formable sublayer (5) comprises a filler.

Item 4. The building panel according to item 3, wherein said filler comprises at least one or more of an organic filler, an inorganic filler, or a combination thereof.

Item 5. The building panel according to item 3 or 4, wherein said filler is calcium carbonate ($CaCO_3$).

Item 6. The building panel according to any one of the preceding items, wherein said formable layer (5) comprises 1-80 wt. % calcium carbonate ($CaCO_3$).

Item 7. The building panel according to item 3 or 4, wherein said filler comprises organic fillers such as wood flour and/or rice husks.

Item 8. The building panel according to any one of the preceding items, wherein said formable sublayer (5) comprises 1-60 wt. % organic filler, preferably 30-50 wt. % organic filler.

Item 9. The building panel according to any one of the preceding items, wherein the formable sublayer (5) has a thickness of 0.1-3 mm, preferably a thickness of 0.2-2 mm, and even more preferably thickness of 0.5-1.5 mm.

Item 10. The building panel according to any one of the preceding items, wherein said formable sublayer (5) comprises plastisol.

Item 11. The building panel according to any one of the preceding items, wherein said formable sublayer (5) comprises a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®.

Item 12. The building panel according to any one of the preceding items, wherein said formable sublayer (5) comprises a thermoplastic material, such as polyvinyl chloride (PVC), polyethylene terephthalate (PET), polyvinyl butyral (PVB), polybutylene terephthalate (PBT), polyethylene (PE), polyester, polystyrene (PS), polypropylene (PP), polycarbonate (PC), polyvinyl acetate (PVAc), ethylene-vinyl acetate (EVA), polyacrylate, methacrylate, acrylonitrile butadiene styrene (ABS), thermoplastic polyurethane (TPU), and/or a combination thereof.

Item 13. The building panel according to any one of the preceding items, wherein the surface layer (6) is a formable layer.

Item 14. The building panel according to any one of the preceding items, wherein the surface layer (6) comprises a décor layer (8), such as a coloured powder layer, a paper sheet, a polymer-based sheet, a wood-based veneer, a cork-based veneer or a fabric, woven or non-woven.

Item 15. The building panel according to any one of the preceding items, further comprising a second layer arrangement (10) arranged on said core (3), on the opposite side of said first layer arrangement (2).

Item 16. A method to manufacture a building panel (1), such as a floor panel, comprising:
joining a first material and a second material to form a first layer (3) and a second layer (5) of a semi-finished panel (1'), wherein said first material comprises at least one or more of a thermoplastic material, a thermoset material, a mineral based material and/or a combination thereof,
applying a third layer (6) on the second layer (5), and
applying heat and pressure to form said building panel (1), wherein the second layer (5) forms a formable sublayer between the first layer (3) and the third layer (6).

Item 17. The method according to item 16, wherein the third layer (6) forms a formable surface layer.

Item 18. The method according to item 16 or 17, further comprising:
embossing the second layer (5) and the third layer (6).

Item 19. The method according to any one of the items 16-18, wherein the second layer (5) comprises at least one or more of a thermoplastic material, a thermoset material, a mineral based material or a combination thereof.

Item 20. The method according to any one of the items 16-19, wherein said second layer (5) comprises a filler.

Item 21. The method according to item 20, wherein said filler comprises at least one or more of an organic filler, an inorganic filler or a combination thereof.

Item 22. The method according to item 20 or 21, wherein said filler is calcium carbonate ($CaCO_3$).

Item 23. The method according to any one of the items 16-22, wherein said second layer (5) comprises 1-30 wt % calcium carbonate ($CaCO_3$).

Item 24. The method according to item 20 or 21, wherein said filler comprises a wood flour and/or rice husks.

Item 25. The method according to any one of the items 16-21, wherein said second layer (5) comprises 1-60 wt. % organic filler, preferably 30-50 wt. % organic filler.

Item 26. The method according to any one of the items 16-25, wherein the second layer (5) has a thickness of 0.1-3 mm, preferably a thickness of 0.2-2 mm, and even more preferably thickness of 0.5-1.5 mm.

Item 27. The method according to any one of the items 16-26, wherein said second layer (5) comprises plastisol.

Item 28. The method according to any one of the items 16-27, wherein said second layer (5) comprises a plasticizer.

Item 29. The method according to any one of the items 16-28, wherein the third layer (6) comprises a décor layer (8), such as a coloured powder layer, a paper sheet, a polymer-based sheet, a wood-based veneer, a cork-based veneer or a fabric, woven or non-woven.

Item 30. The method according to any one of the items 16-29, further comprising:
applying a fourth layer (12) on the first layer (3) opposite the second layer (5), wherein said fourth layer (12) forms a balancing layer of said building panel (1).

The invention claimed is:

1. A method to manufacture a building panel comprising:
joining a first material and a second material to form a first layer and a second layer of a semi-finished panel, wherein said first material comprises at least one or more of a thermoplastic material, a thermoset material, a mineral based material and/or a combination thereof,
applying a third layer on the second layer, and
applying heat and pressure to form said building panel,
wherein the first layer forms a core of the building panel and the third layer forms a surface layer of the building panel, and
wherein the second layer forms a sublayer between the first layer and the third layer of the building panel,
wherein the second layer is configured to be at least partly plastically deformed when heat and pressure is applied, wherein the second layer is plastically deformable, such that the shape of the second layer is changeable under the application of heat and pressure and the changed shape is maintained during and after the application of heat and pressure, and such that a depression of at least 0.04 mm is formed when an embossing plate with a rill of 1.2 mm depth and a base width of 2 mm is pressed against the second layer at a pressure of 20 bar and a temperature of 80° C. for 35 seconds, wherein the second layer is more plastically deformable than the first layer.

2. The method according to claim 1, wherein the first material comprises at least 10 wt % of a thermoplastic material.

3. The method according to claim 1, wherein the first material comprises 10-40 wt % of a thermoplastic material.

4. The method according to claim 1, wherein the first material comprises 10-70 wt % of a thermoset material.

5. The method according to claim 1, wherein the first material comprises at least 50 wt % of a mineral based material.

6. The method according to claim 1, wherein applying heat and pressure to form said building panel further comprises
embossing the second layer and the third layer, wherein the second layer and the third layer are at least partly plastically deformed by the embossing.

7. The method according to claim 1, wherein the second layer comprises at least one or more of a thermoplastic material, a thermoset material, or a combination thereof.

8. The method according to claim 1, wherein said second layer comprises a filler.

9. The method according to claim 8, wherein said filler comprises at least one or more of an organic filler, an inorganic filler or a combination thereof.

10. The method according to claim 1, wherein the second layer has a thickness of 0.1-2 mm.

11. The method according to claim 1, wherein said second layer comprises plastisol.

12. The method according to claim 1, wherein said second layer comprises a plasticizer.

13. The method according to claim 12, wherein the second layer comprises 1-30 wt. % plasticizer.

14. The method according to claim 1, wherein the second layer comprises at least two different types of polymers.

15. The method according to claim 14, wherein the second layer comprises a material blend comprising a PVC/PVAc co-polymer.

16. The method according to claim 15, wherein the PVAc content in the material blend of the second layer is 1-20 wt. %.

17. The method according to claim 1, wherein the third layer comprises a décor layer.

18. The method according to claim 1, wherein the third layer comprises a wear layer.

19. The method according to claim 1, further comprising:
applying a fourth layer on the first layer opposite the second layer, wherein said fourth layer forms a balancing layer of said building panel.

20. The method according to claim 19, wherein the fourth layer is configured to be plastically deformed when heat and pressure is applied.

21. A building panel obtainable by the method according to claim 1.

22. The method of claim 1, wherein the second layer is plastically deformable such that a depression of at least 0.1 mm is formed when an embossing plate with a rill of 1.2 mm depth and a base width of 2 mm is pressed against the second layer at a pressure of 20 bar and a temperature of 80° C. for 35 seconds.

23. The method of claim 1, wherein a depression in the plastically deformable layer may be at least 10% deeper than a depression formed in the core when each are pressed with an embossing plate with a rill of 1.2 mm depth and a base width of 2 mm at a pressure of 20 bar and a temperature of 80° C. for 35 seconds.

24. The method of claim 1, wherein a depression in the plastically deformable layer may be at least 50% deeper than a depression formed in the core when each are pressed with an embossing plate with a rill of 1.2 mm depth and a base width of 2 mm at a pressure of 20 bar and a temperature of 80° C. for 35 seconds.

25. The method of claim 6, wherein a depression formed by the embossing in the sublayer has a depth of at least 50% of the thickness of the sublayer.

26. The method of claim 6, wherein a depression formed by the embossing in the sublayer has a depth of at least 70% of the thickness of the sublayer.

\* \* \* \* \*